United States Patent [19]

Suga et al.

[11] Patent Number: 5,537,531

[45] Date of Patent: Jul. 16, 1996

[54] PORTABLE COMPUTER WITH A BANK SWITCH FOR SWITCHING BETWEEN A ROM AND A MEMORY, BOTH ALLOCATED TO THE SAME ADDRESS SPACE, BY CHANGING A PORT ADDRESS OF A KEYBOARD CONTROLLER

[75] Inventors: Masao Suga; Syuzo Nakajima; Tadaaki Inomata; Toshimitsu Saito; Atsuhiro Outake; Yoshiaki Iba; Hidekazu Mihara; Hirofumi Nishikawa; Nobuyuki Nanno; Shigeru Satake, all of Tokyo, Japan

[73] Assignee: Kabushiki Kaisha Toshiba, Kawasaki, Japan

[21] Appl. No.: 81,215

[22] Filed: Jun. 25, 1993

[30] Foreign Application Priority Data

Jun. 26, 1992 [JP] Japan .................................. 4-169629
Jun. 26, 1992 [JP] Japan .................................. 4-169632

[51] Int. Cl.$^6$ .................................................... G06F 12/00
[52] U.S. Cl. ........................................ 395/164; 395/162
[58] Field of Search .................................. 395/162, 164, 395/166; 364/200, 900

[56] References Cited

U.S. PATENT DOCUMENTS

| | | | |
|---|---|---|---|
| 4,028,678 | 6/1977 | Moran | 395/425 |
| 4,475,176 | 10/1984 | Ishii | 395/400 |
| 4,542,453 | 9/1985 | Patrick et al. | 364/200 |
| 4,831,522 | 5/1989 | Henderson et al. | 364/200 |
| 4,984,149 | 1/1991 | Iwashitu et al. | 364/200 |
| 5,167,024 | 11/1992 | Smith et al. | 395/375 |
| 5,274,816 | 12/1993 | Oka . | |
| 5,293,494 | 3/1994 | Saito | 395/275 |
| 5,297,286 | 3/1994 | Uehara | 395/700 |
| 5,333,309 | 7/1994 | Hibi | 395/575 |

FOREIGN PATENT DOCUMENTS

| | | |
|---|---|---|
| 0192021 | 1/1986 | European Pat. Off. . |
| 0318599 | 6/1988 | European Pat. Off. . |
| 0330226 | 2/1989 | European Pat. Off. . |
| 0415376 | 8/1990 | European Pat. Off. . |
| 0443713 | 8/1991 | European Pat. Off. . |
| 0483865 | 10/1991 | European Pat. Off. . |

OTHER PUBLICATIONS

The star User Interface: An Overview, D. C. Smith et al., AFIPS Conference Proceedings, 515–528 (1982).
Lisa Draw, Apple Computer, Inc., pp. A1–A43 (1983).
Eaton, J. T. et al., "Design of HP's Portable Computer Family," Hewlett–Packard, vol. 37, No. 7, Jul. 1986, pp. 4–13.
May, R. B. et al., "Personal Applications Manager for HP's Portable Computers", Hewlett–Packard Journal, vol. 37, No. 7, Jul. 1986, pp. 18–21.
Rowe, M. S., "Memory Management for Portable Computers," Hewlett–Packard Journal, vol. 37, No. 7, Jul. 1986, pp. 21–25.
Icon Safe Zone, IBM Technical Disclosure Bulletin, vol. 35, No. 6, Nov. 1992, pp. 34–35.
Andrews, David et al., "A PC and 1-2-3 in the Palm of Your Hand," BYTE, vol. 16, No. 5, May 1991, pp. 44–46.
HP 100LX User's Guide and Examples, Hewlett Packard Company, Mar. 1993, pp. 1–1 to 1–8, 5–1 to 5–8 and 7–1.
Piper, Bob, "Striking a Light Note", What Micro?, Jan. 1990, pp. 16–20.

(List continued on next page.)

Primary Examiner—Mark R. Powell
Assistant Examiner—U. Chauhan
Attorney, Agent, or Firm—Finnegan, Henderson, Farabow, Garrett & Dunner

[57] ABSTRACT

A portable computer that includes a first ROM for storing an OS, a second ROM for storing at least one piece of existing application software, and a flat display panel for displaying at least one icon to read out the existing application software stored in the second ROM. Since the DOS and the application program are respectively stored in a DOS ROM and an application ROM, the DOS or the application can be quickly executed without install processing from floppy disks.

7 Claims, 21 Drawing Sheets

OTHER PUBLICATIONS

Johnson, Jeff et al., "The Xerox Star: A Retrospective," Computer, vol. 22, No. 9, Sep. 1989, pp. 11–29.

Rupo, Toshiba Corporation, pp. 1–6 (translated), 1992.

Guidebook for DynaBook EZ, Toshiba Corporation, pp. 84–85 and 376–380 (translated), 1992.

Toshiba T1000 User's Manual, Internal 768KB Memory Expansion Board, Toshiba Corporation, pp. 2–8 to 2–11, 1987.

Jerry Jex, "Flash Memory BIOS for PC & Notebook Computers", IEEE Conf. on Comm. Comp. & Sig Process. pp. 692–695 May 1991.

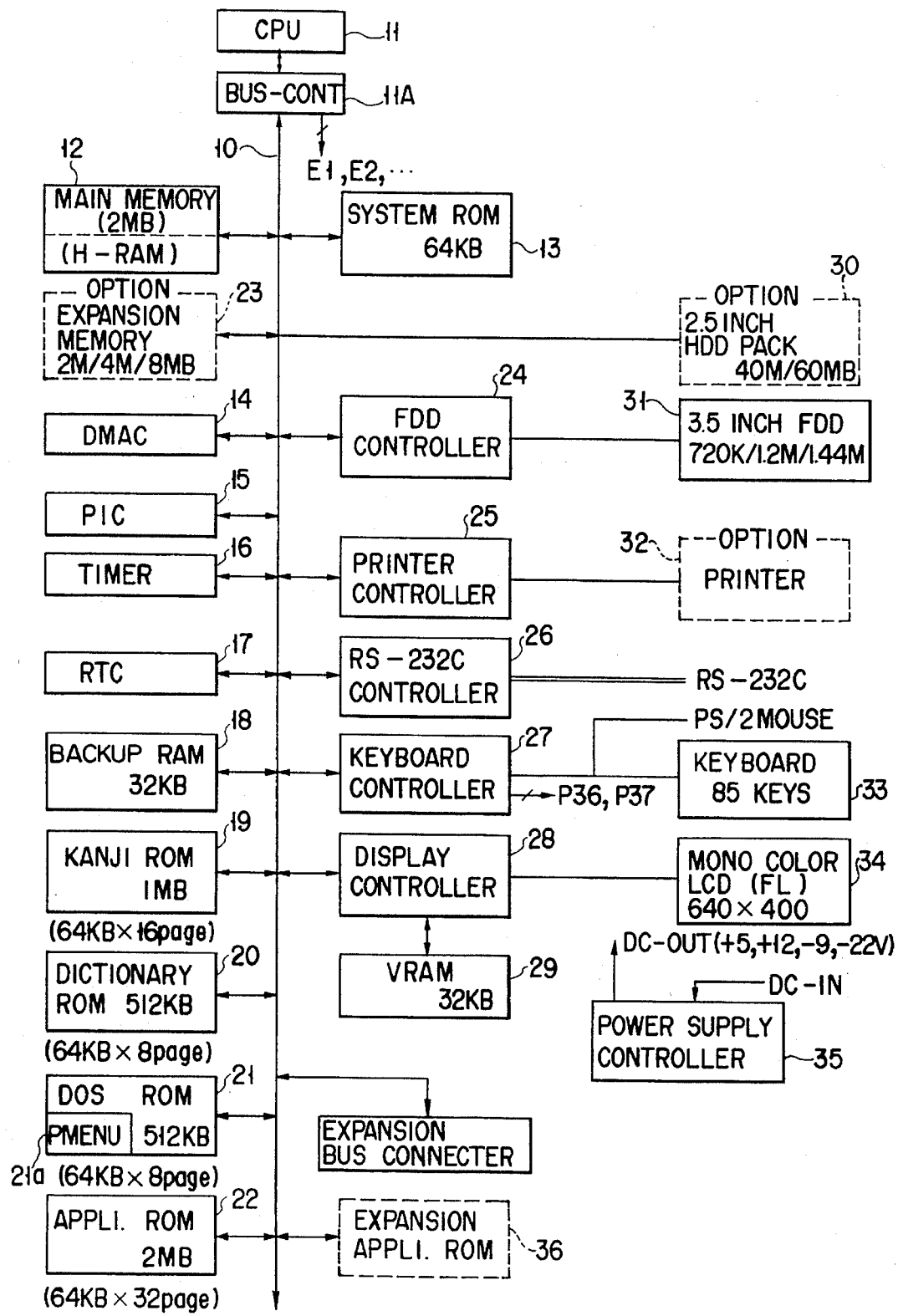
F I G. 1

WHICH MENU DO YOU WANT TO CHANGE ?

```
┌─────────────┐
│    USER     │            USER
│REGISTRATION.1│        REGISTRATION. 2
└─────────────┘
```
(ENTER) REGISTRATION/CHANGE  (DEL) DELETE

F I G. 10

THE CURRENT TITLE OF USER REGISTRATION 1
IS "USER REGISTRATION 1"
ENTER NEW TITLE

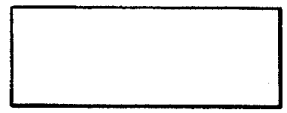

F I G. 11

THE CURRENT TITLE OF USER REGISTRATION 1
IS "USER REGISTRATION 1"
ENTER NEW TITLE

```
┌──────────┐
│   GAME   │
└──────────┘
```

F I G. 12

ENTER FILE NAME TO BE EXECUTED
IN "GAME"

GAME.EXE

F I G. 13

ENTER DESCRIPTION CORRESPONDING TO TITLE "GAME"

COFFEE BREAK. ENJOYABLE GAME //

F I G. 14

INSTALLATION OF SOFTWARE (→ ← ↑ ↓) SELECT          (PREV/NEXT) PAGE CHANGE
       (ENTER) INSTALL                    (ESC) COMPLETION

F I G. 15

| | 70H | |
| --- | --- | --- |
| | KBC PORT | |
| | P37 | P36 |
| KANJI ROM | 0 | 0 |
| APPLI. ROM (WORD PROCESSOR) | 0 | 1 |
| APPLI. ROM (SPREAD SHEET) | 1 | 0 |
| EXPANSION APPLI. ROM | 1 | 1 |

| | 60H | |
| --- | --- | --- |
| | KBC PORT | |
| | P37 | P36 |
| DICTIONARY ROM | 0 | 0 |
| | 0 | 1 |
| DOS ROM | 1 | 0 |
| | 1 | 1 |

[ SYSTEM SETUP ]

1. MEMORY CAPACITY
    TOTAL MEMORY         = 2048KB
    SYSTEM MEMORY        = 640KB
    HARD RAM             = 1024KB
    EMS MEMORY           = 384KB
    PM MEMORY            = 0KB
    HIGH SPEED ROM       = 0KB

2. DISPLAY
    INVERTED DISPLAY     = DISABLE

3. FDD/PRINTER
    INTERNAL FDD TYPE    = 1.2/1.44MB
    EXTERNAL FDD/PRT     = PRINTER
    PRINTER PORT         = OUTPUT ONLY

4. HARD DISK
    HARD DISK CAPACITY   = NO DRIVE

5. COMMUNICATION
    SERIAL PORT          = COM1

6. POWER SAVE OPTION
    HDD AUTO OFF TIME         = DISABLE
    DISPLAY AUTO OFF TIME     = DISABLE
    CPU SLEEP                 = DISABLE

7. OTHERS
    RESUME FUNCTION      = ENABLE
    POPUP FUNCTION       = ENABLE
    SPEAKER SOUND        = ENABLE
    BATTERY ALARM        = ENABLE
    KEYBOARD MODE        = 84 KEYS
    EXECUTION OF DOS     = DOS ROM (FDD/HDD)

FIG. 20

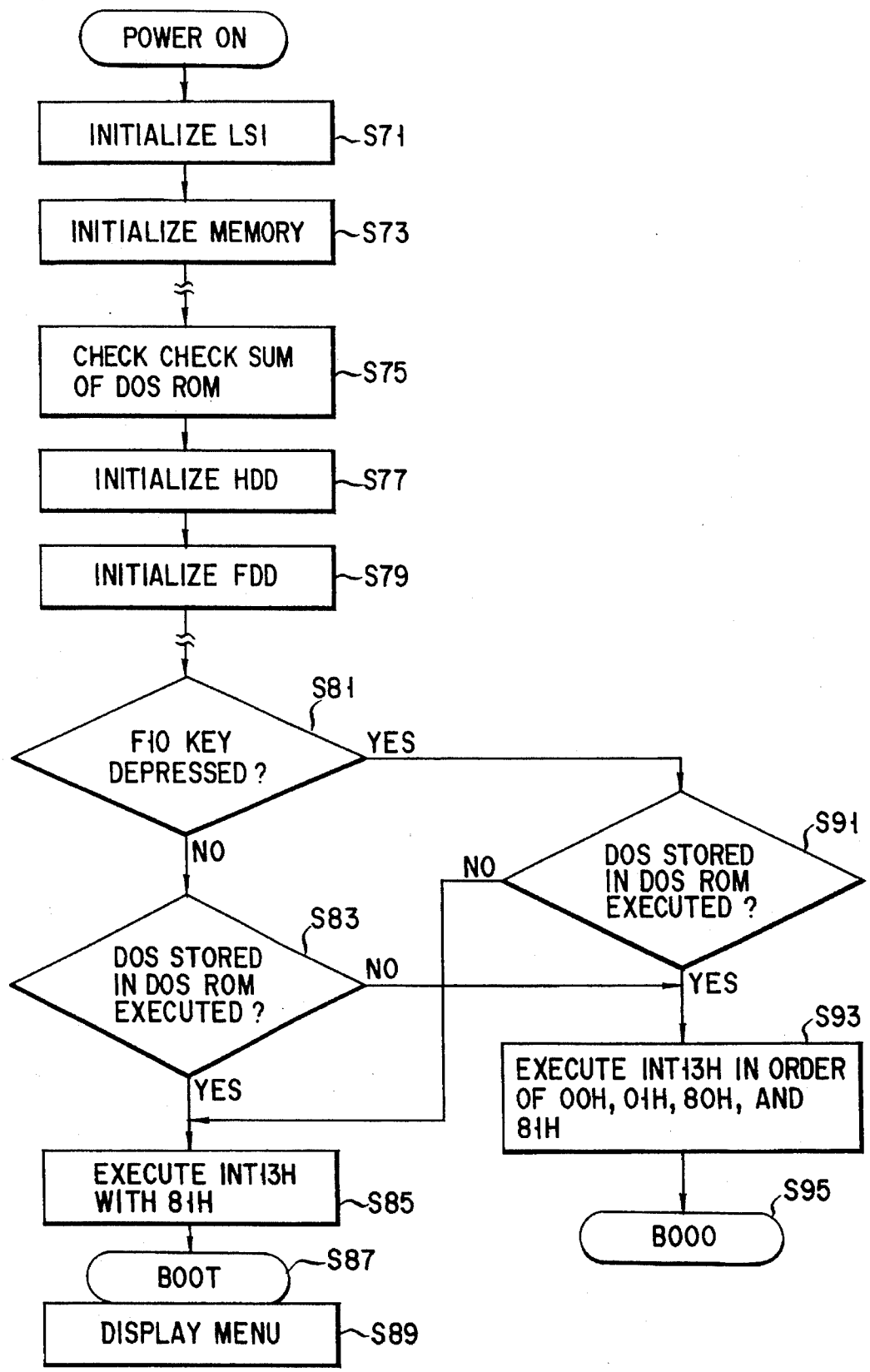
F I G. 21

[SYSTEM SETUP]

1. MEMORY CAPACITY
   TOTAL MEMORY         = 2048KB
   SYSTEM MEMORY        = 640KB
   HARD RAM             = 1024KB
   EMS MEMORY           = 384KB
   PM MEMORY            = 0KB
   HIGH SPEED ROM       = 0KB

2. DISPLAY
   INVERTED DISPLAY     = DISABLE

3. FDD/PRINTER
   INTERNAL FDD TYPE    = 1.2/1.44MB
   EXTERNAL FDD/PRT     = PRINTER
   PRINTER PORT         = OUTPUT ONLY

4. HARD DISK
   HARD DISK CAPACITY   = NO DRIVE

5. COMMUNICATION
   SERIAL PORT          = COM 1

6. POWER SAVE OPTION
   HDD AUTO OFF TIME        = DISABLE
   DISPLAY AUTO OFF TIME    = DISABLE
   CPU SLEEP                = DISABLE

7. OTHERS
   RESUME FUNCTION      = ENABLE
   POPUP FUNCTION       = ENABLE
   SPEAKER SOUND        = ENABLE
   BATTERY ALARM        = ENABLE
   KEYBOARD MODE        = 84 KEYS
   EXECUTION OF DOS     = DOS ROM (FDD/HDD)
   DOS ROM              = USED    (NOT USED)

F I G. 22

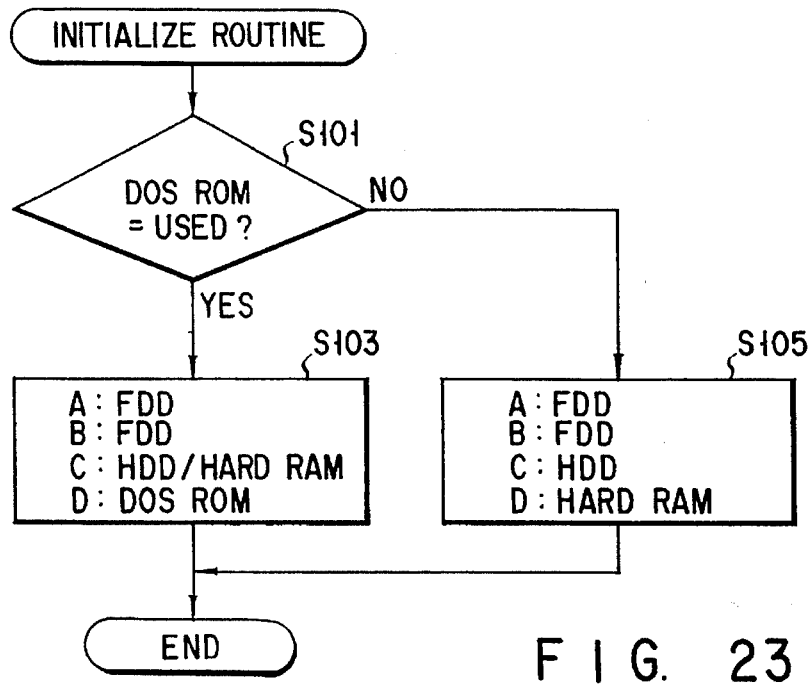
F I G. 23
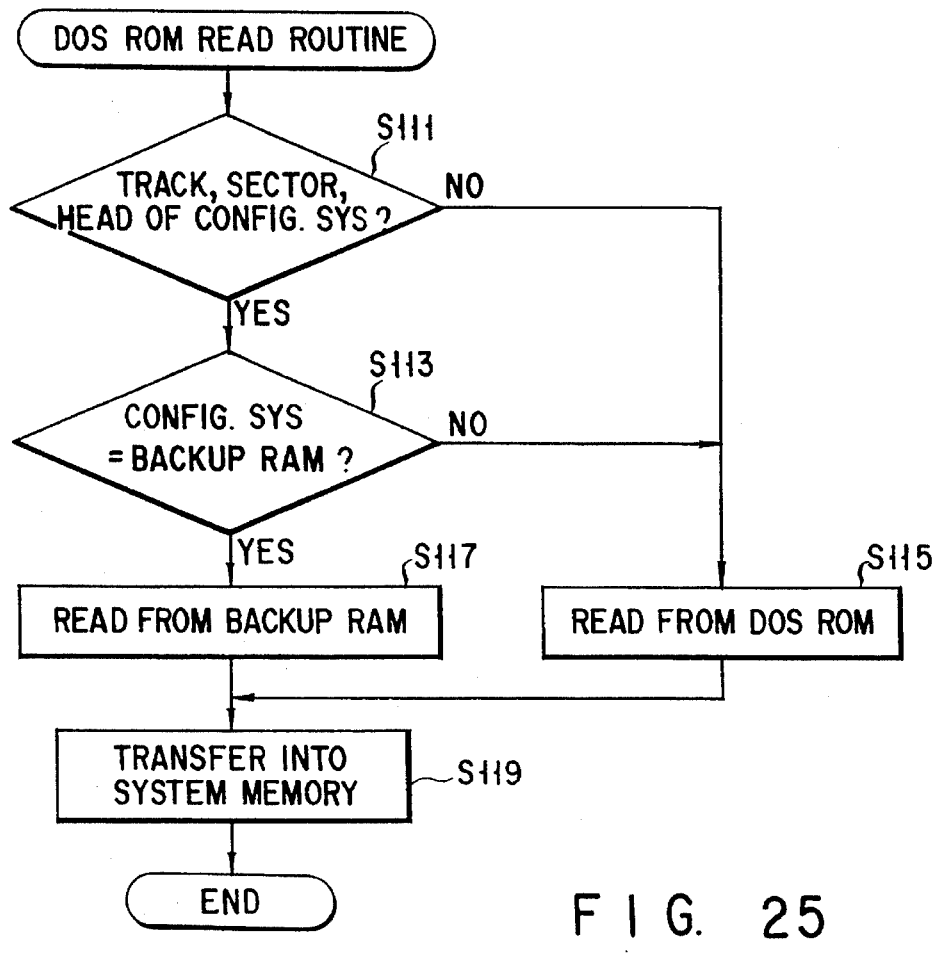
F I G. 25

[SYSTEM SETUP]

1. MEMORY CAPACITY
   TOTAL MEMORY       = 2048KB
   SYSTEM MEMORY      = 640KB
   HARD RAM           = 1024KB
   EMS MEMORY         = 384KB
   PM MEMORY          = 0KB
   HIGH SPEED ROM     = 0KB

2. DISPLAY
   INVERTED DISPLAY   = DISABLE

3. FDD/PRINTER
   INTERNAL FDD TYPE  = 1.2/1.44MB
   EXTERNAL FDD/PRT   = PRINTER
   PRINTER PORT       = OUTPUT ONLY

4. HARD DISK
   HARD DISK CAPACITY = NO DRIVE

5. COMMUNICATION
   SERIAL PORT        = COM1

6. POWER SAVE OPTION
   HDD AUTO OFF TIME       = DISABLE
   DISPLAY AUTO OFF TIME   = DISABLE
   CPU SLEEP               = DISABLE

7. OTHERS
   RESUME FUNCTION    = ENABLE
   POPUP FUNCTION     = ENABLE
   SPEAKER SOUND      = ENABLE
   BATTERY ALARM      = ENABLE
   KEYBOARD MODE      = 84 KEYS
   EXECUTION OF DOS   = DOS ROM (FDD/HDD)
   DOS ROM            = USED   (NOT USED)
   CONFIG.SYS         = DOS ROM (BACKUP RAM)

FIG. 24

PORTABLE COMPUTER WITH A BANK SWITCH FOR SWITCHING BETWEEN A ROM AND A MEMORY, BOTH ALLOCATED TO THE SAME ADDRESS SPACE, BY CHANGING A PORT ADDRESS OF A KEYBOARD CONTROLLER

BACKGROUND OF THE INVENTION

1. Field of the Invention

The present invention relates to a portable computer having a function of storing an operating system (OS) and application software in read only memories (ROM) and allowing selection of a task (to be executed) on a menu icon screen.

2. Description of the Related Art

In a conventional portable computer such as a laptop computer or a notebook computer, when tasks based on various types of application software are to be executed, various types of operations are required, e.g., installation of an OS (operating system) as basic software for a system operation from a floppy disk, a hard disk, or the like into the main memory; and entry of execution commands, prior to the execution of the tasks. For this reason, especially for unskilled persons, a problem is posed in terms of operability.

In general, it takes a lot of time to access a disk drive. Therefore, a long period of time is required to install a program from a floppy disk or a hard disk.

In the method of storing a program in a hard disk drive in advance, although there is no need to mount a floppy disk in the portable computer, the hard disk drive must be arranged as a standard unit, resulting in an increase in the cost of the portable computer. This is because a portable computer having a hard disk drive incorporated therein is more expensive than a portable computer having no hard disk drive incorporated therein. In addition, since part of the hard disk drive is occupied by the program, the capacity used for storing other programs and user data such as files is undesirably limited.

In the method of installing the program from the floppy disk upon menu selection, since insertion of the floppy disk into the portable computer main body, loading of the program from the floppy disk, and the like are required, it takes a lot of time to actually execute the program after menu selection is performed. Therefore, in this method, satisfactory operability cannot be obtained, even though no built-in hard disk is required.

SUMMARY OF THE INVENTION

It is an object of the present invention to provide portable computer which stores an OS and application software in ROMs, and can display a menu screen having a menu icon arrangement ensuring good operability.

It is another object of the present invention to provide a portable computer which can quickly start a desired program without performing installation from a disk drive, and can realize a relatively low cost and satisfactory operability.

According to the first aspect of the present invention, a portable computer comprising a first ROM for storing an OS, a second ROM for storing at least one piece of existing application software, and a flat panel display for displaying at least two icons to read out the existing application software stored in the second ROM.

According to the second aspect of the present invention, there is provided a portable computer comprising a first ROM for storing an OS, a second for storing at least two pieces of existing application software, a memory device for storing application software registered by a user, and a flat panel display for displaying at least two icons to read out the existing application software stored in the second ROM and the application software registered in the memory device by the user.

According to the third aspect of the present invention, there is provided a portable computer comprising an OS stored in a ROM, at least two pieces of existing application software stored in a ROM, and a flat panel display for displaying a first icon for reading out the OS stored in the ROM, and at least two second icons for reading out the existing application software stored in the ROM.

According to the fourth aspect of the present invention, there is provided a portable computer comprising a first ROM for storing an OS, a second ROM for storing at least one piece of existing application software, a third ROM, additionally set by a user, for storing at least one piece of user registration application software, and a flat panel display for displaying at least three icons for reading out the OS and the application software from the first through third ROMs.

According to the fifth aspect of the present invention, there is provided a portable computer which operates under the control of an operating system, comprising a first ROM for storing the operating system in advance, the first ROM being allocated to the same address space as that allocated to a predetermined memory in the portable computer, and bank switching means for allocating the first ROM and the memory, allocated to the same address space, as first and second memory banks, and performing bank switching between the first and second memory banks to allow selective access to the first ROM and the memory.

According to the portable computer of the present invention, by storing an OS and an application software system in ROMs, the OS and the application software system can be very easily started at high speed.

In addition, since a ROM in which user registration application software is stored is additionally set by the user, application software can be arbitrarily added as needed.

In this portable computer, since the operating system is stored in the first ROM, the operating system can be quickly started without performing installation from the disk drive. Therefore, a portable computer with good operability can be obtained at a relatively low cost.

Furthermore, the first ROM in which the operating system is written is mapped in the same address space as that of the predetermined memory in the portable computer, and can be selectively used by bank switching. For this reason, even if the first ROM in which the operating system is stored is arranged, the address space allocated to the memories in the portable computer need not be increased. Therefore, the limited memory address space can be effectively used.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the system configuration of a portable computer according to the first embodiment of the present invention;

FIG. 10 is a view showing a user registration screen in the first embodiment;

FIG. 11 is a view showing a user registration screen in the first embodiment;

FIG. 12 is a view showing a user registration screen in the first embodiment;

FIG. 13 is a view showing a user registration screen in the first embodiment;

FIG. 14 is a view showing a user registration screen in the first embodiment;

FIG. 15 is a view showing a software install screen in the first embodiment;

FIG. 20 is a view showing a setup screen in the portable computer according to the first embodiment;

FIG. 21 is a flow chart for explaining an operation to be performed when the system of a portable computer according to the second embodiment of the present invention is started;

FIG. 22 is a view showing a setup screen of the portable computer according to the third embodiment of the present invention;

FIG. 23 is a flow chart for explaining device number allocating operations to be performed when the DOS is used and not used, respectively;

FIG. 24 is a view showing a setup screen in a portable computer according to the fourth embodiment of the present invention;

FIG. 25 is a flow chart for explaining selection of a system configuration file in the fourth embodiment;

DETAILED DESCRIPTION OF THE PREFERRED EMBODIMENTS

Figure 2:
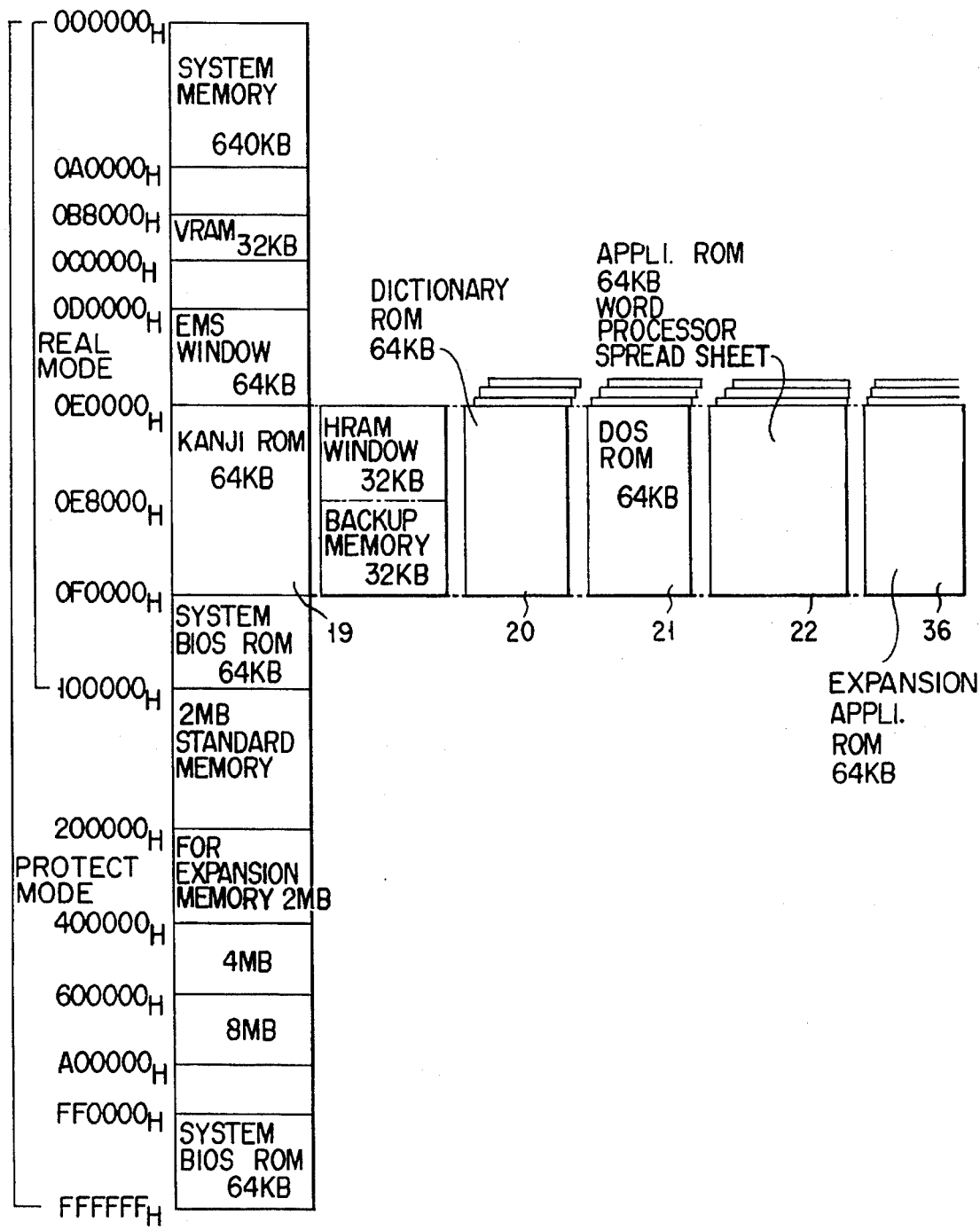
FIG. 2 is a view showing the memory map of the portable computer according to the first embodiment.

Embodiments of the present invention will be described below with reference to the accompanying drawings.

FIG. 1 shows the system arrangement of a portable computer according to a first embodiment of the present invention. This portable computer is a laptop type or notebook type portable computer and comprises a system bus 10 and the following components connected to the system bus 10: a CPU 11, a bus controller 11A, a main memory 12, and an option expansion memory 23, a DMAC (Direct Memory Access Controller) 14, a programable interrupt controller (PIC) 15, a timer 16, and a real-time clock (RTC) 17.

Referring to FIG. 1, the CPU 11 controls the overall system. When basic software for the system operation, e.g., the MS-DOS (registered trademark), stored in a ROM (DOS ROM 21) in the computer is installed, the CPU 11 starts a menu display processing program (P MENU) 21a stored in the DOS ROM 21 in initialization processing, and executes processing routines associated with menu display, such as the ones shown in the flow charts in FIGS. 5 through 9, and processing routines such as the ones shown in FIGS. 19, 21, 23, 25, 27, and 28. More specifically, when the system power is turned on, and the MS-DOS is installed from the built-in DOS ROM 21 located in a memory space in which the banks of the computer main body can be accessed, instead of installing the MS-DOS from a floppy disk drive (FDD) 31 or a hard disk (HDD (option)) 30, the menu display processing program (P MENU) 21a stored in the DOS ROM 21 is executed by the DOS, thus executing processing routines associated with menu display, such as the ones shown in FIGS. 5 through 9, and processing routines such as the ones shown in FIGS. 19, 21, 23, 25, 27, and 28.

The CPU 11 also has the function of selectively accessing five ROMs (a kanji ROM 19, a dictionary ROM 20, the DOS ROM 21, an application ROM 22, and an expansion application ROM 36, mapped in the same address space), an HRAM window 12, and a backup RAM 18 (these memories will be describe later) by using a memory bank switching technique.

Figure 3:
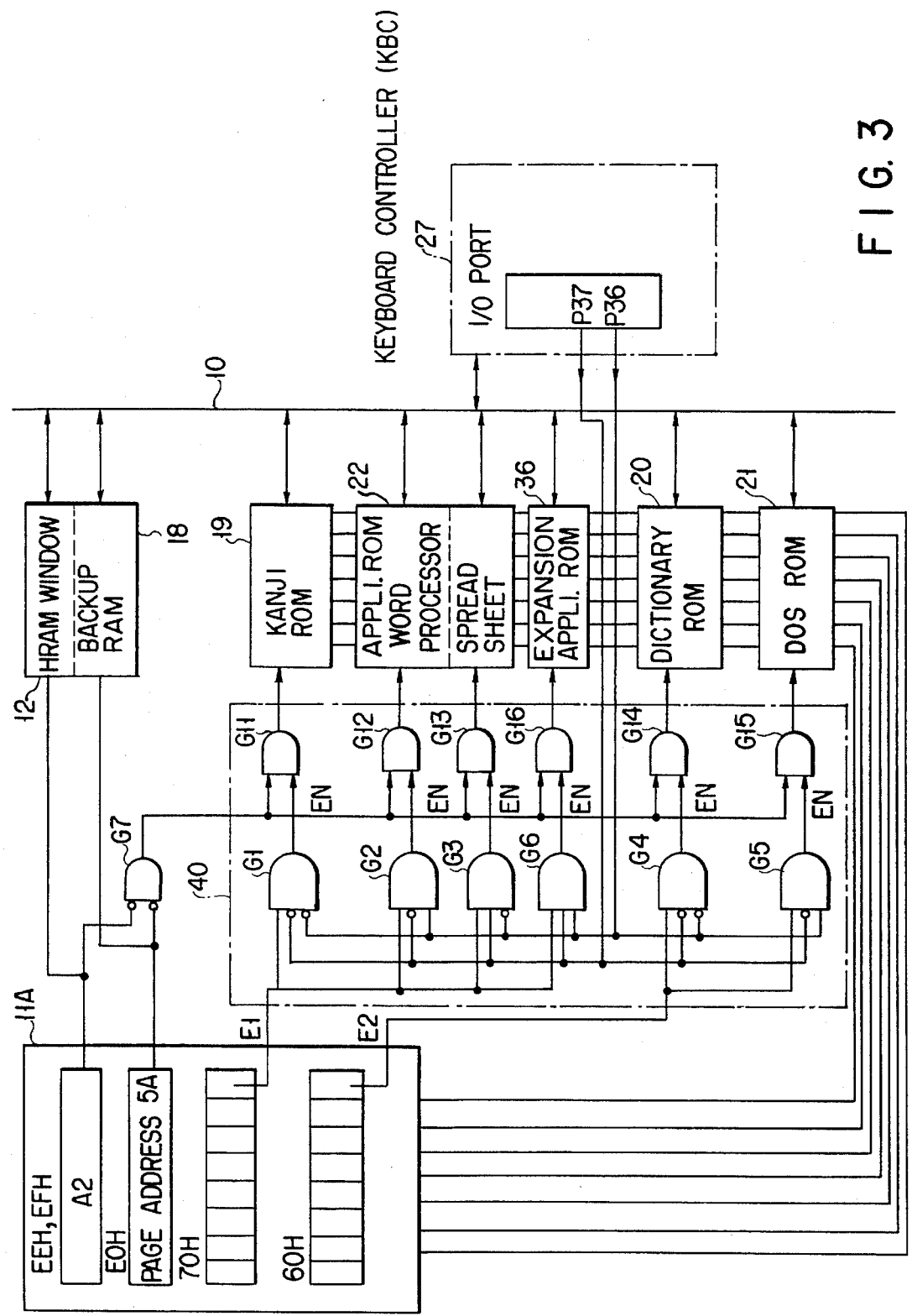
FIG. 3 is a circuit diagram showing a hardware arrangement for inter-ROM bank switching in the first embodiment.

Reference numeral 11A denotes a bus controller for performing bus access control, bus cycle control, and the like of various system components such as I/O units. In this case, as shown in FIG. 3, enable signals E1 and E2 output from the bus controller 11A are used for bank switching between the kanji ROM 19, the dictionary ROM 20, the DOS ROM 21, the application ROM 22, and the expansion application ROM 36.

The main memory 12 is used as a storage area for a real-mode program (to be executed), a work area, and the like. In this case, the main memory 12 has a capacity of 2 MB. Part of the area of the main memory 12 except for the system program area (640 KB) shown in FIG. 2 can be set as a hard RAM (H-RAM). In this embodiment of the present invention, the hard disk (HDD pack) 30 is not mounted, but the above-mentioned hard RAM is set instead. In this hard RAM, a file for storing menu display management data including menu icon display location data is arranged. An associated operation will be described later.

A system ROM 13 stores control programs including an IRT processing routine. In this case, the control programs include a processing routine for automatically installing the DOS ROM 21 incorporated, as a standard unit, in the computer, when it is confirmed that the MS-DOS is not supplied from the floppy disk drive 31, the hard disk (HDD) 30, or the like, in initialization processing to start the system. Note that the DOS ROM 21 stores the menu display processing program (P MENU) 21a having the processing functions shown in FIGS. 5 through 9, and the processing routines shown in FIGS. 19, 21, 23, 25, 27, and 28. The DOS stored in the DOS ROM 21 treats the menu display processing program (P MENU) 21a as one execution file.

The DMA controller (DMAC: Direct Memory Access Controller) 14 performs direct data transfer by directly performing access control with respect to the main memory 12. The programmable interrupt controller (PIC) 15 controls interruption in accordance with a set program. The timer (Programmable Interval Timer) 16 executes a timer count operation in accordance with a set program. The real-time clock (RTC) as a timepiece module has a CMOS memory for storing data and is used, for example, to store setup data. The backup RAM 18 backed up by a battery is used, for example, to store system configuration data set by the user.

The kanji ROM 19 stores various kanji fonts. The dictionary ROM 20 is used as a kana/kanji conversion table. The kanji ROM 19 and the dictionary ROM 20 are mapped in the same 64-Kbyte address space together with the DOS ROM 21 and the application ROM 22 (both will be described later), as shown in FIG. 2, and are selectively read-accessed by bank switching, as shown in FIG. 3.

The DOS ROM 21 stores the MS-DOS as basic software for the system operation of this computer system, and the menu display processing program (P MENU) 21a driven by the DOS and having the processing functions shown in FIGS. 5 through 9. In this case, the DOS ROM 21 consists of 512 Kbytes (64 Kbytes×8 pages). As shown in FIG. 2, the DOS ROM 21 is mapped in the same memory space, in which bank access can be performed, together with the kanji ROM 19, the dictionary ROM 20, the application ROM 22, and the expansion application ROM 36. The DOS ROM 21 is selectively accessed by the bank switching circuit shown in FIG. 3.

With the DOS ROM 21, the system can be automatically started without installing the MS-DOS from the floppy disk drive (FDD) 31, the hard disk (HDD pack) 30, or the like upon turning on the system power. In this case, a menu for task selection is automatically displayed when the menu display processing program (P MENU) 21a is started. On this menu, the user can select various operations including application programs stored in the application ROM 22.

In this case, the application ROM 22 stores a Japanese wordprocessor application program and a spreadsheet application program as application software.

Similar to the above-described DOS ROM 21, the application ROM 22 is mapped in the same memory space, in which bank access can be performed, together with the kanji ROM 19, the dictionary ROM 20, and the expansion application ROM 36, as shown in FIG. 2, and is selectively accessed by the bank switching circuit shown in FIG. 3. According to the system of this embodiment, therefore, when the system power is turned on, and "WORD PROCESSOR" or "SPREADSHEET" is selected from the displayed menu for task selection, the selected task can be immediately executed without installing the MS-DOS, application software, and the like from the floppy disk drive 31, the hard disk (HDD pack) 30, or the like.

The expansion memory 23 is optionally connected to the computer to expand the memory area as needed.

Of the above-described ROMs, the kanji ROM 19, the dictionary ROM 20, the DOS ROM 21, and the application ROM 22 are constituted by mask ROMs, respectively, but the expansion memory 23 is constituted by a one-time PROM (OTP).

An FDD controller 24 controls the floppy disk drive (FDD) 31 for driving a 3.5-inch floppy disk (FD). Reference numeral 25 denotes a printer controller for controlling a printer 32 connected as an option; and 26 denotes an RS-232C controller for controlling an RS-232C interface connected as an option.

A keyboard controller 27 controls a keyboard 33, a mouse, and the like. 2-bit signals (P36 and P37) output from I/O ports of the keyboard controller 27 are used for bank switching between the kanji ROM 19, the dictionary ROM 20, the DOS ROM 21, and the application ROM 22, as shown in FIG. 3.

A display controller 28 performs read/write control with respect to a video RAM (VRAM) 29, and drives/controls a liquid crystal display 34 having a resolution of 640×400 dots.

A power supply controller 35 having a special microprocessor for ON/OFF-controlling the system power generates various kinds of power including backup power required for the system by using power from an AC adaptor, a built-in battery, and the like, and controls charging of the built-in battery.

Figures 16, 17, 18:
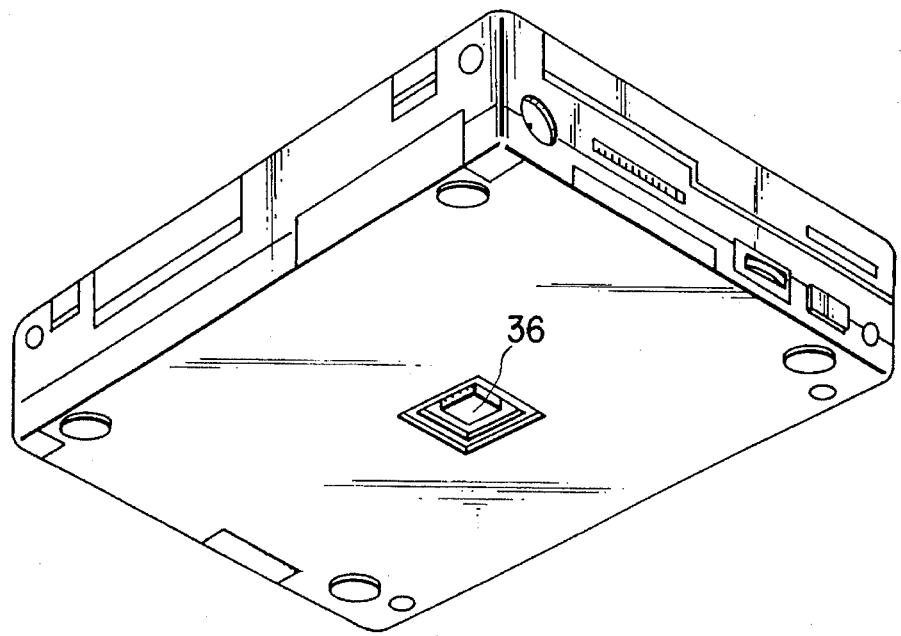
FIG. 16 is a perspective view showing a state wherein an expansion application RAM is mounted.
FIG. 17 is a view for explaining a selecting operation performed by a gate circuit in FIG. 3 to select a kanji ROM and an application ROM.
FIG. 18 is a view for explaining a selecting operation performed by the gate circuit in FIG. 3 to select a dictionary ROM and a DOS ROM.

The ROM 36 expanded by the user is an expansion application ROM for storing application software registered by the user. For example, as shown in FIG. 16, the expansion application ROM 36 is designed to be mounted from the bottom of the computer main body. More specifically, the expansion application ROM 36 is mounted in an opening in the bottom to be connected to the computer main body through a connector, and a lid is put on the opening. Assume that a programmable memory (e.g., an EEPROM or a mask ROM) is used as the expansion application ROM 36. In this case, if the system is designed such that the application software registered by the user can be freely replaced, and the new application software can be selected by a menu icon, a personal computer incorporating application software arbitrarily registered by the user can be constructed.

FIG. 2 shows the memory map of the portable computer in the above-described embodiment.

As shown in FIG. 2, the kanji ROM 19, the HRAM window 12/the backup RAM 18, the dictionary ROM 20, the DOS ROM 21, the application ROM 22, and the expansion application ROM 36 are commonly allocated to a 64-Kbyte area from address "0E0000H" through address "0F0000H".

For this reason, exclusive control is required for access to the kanji ROM 19, the HRAM window 12/backup RAM 18, the dictionary ROM 20, the DOS ROM 21, the application ROM 22, and the expansion application ROM 36.

This exclusive control can be realized by an inter-ROM bank switching method in which hardware control is performed to set one ROM in an enable state while setting the remaining ROMs in a disabled state.

This inter-ROM bank switching method is performed by hardware using the signals (E1 and E2) output from the bus controller 11A and the signals (P36 and P37) output from the I/O ports of the keyboard controller 27. The detailed arrangement of this hardware will be described later with reference to FIG. 3.

Figure 30:
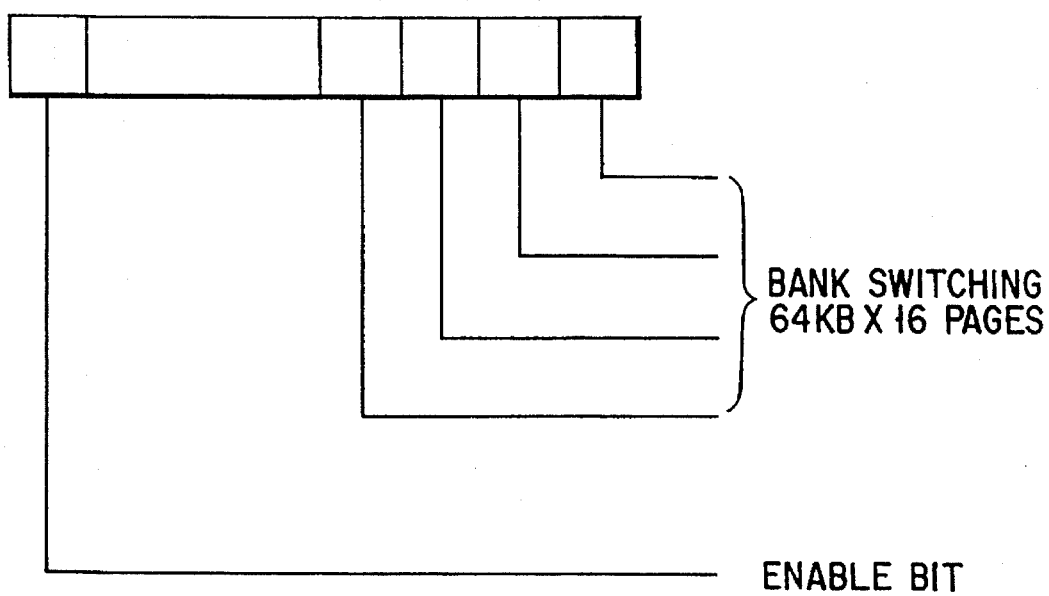
FIG. 30 is a view showing designation of a register for controlling bank switching when a 1-MB kanji ROM 19 is selected.
Figure 31:
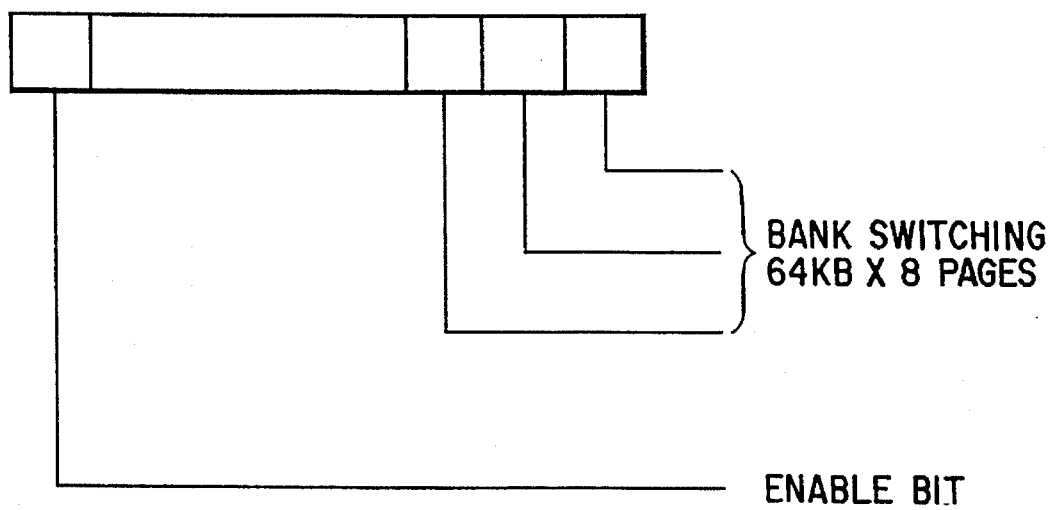
FIG. 31 is a view showing designation of a register for controlling bank switching when a 512-KB dictionary ROM 20 is selected.

Bank switching in a ROM selected by the inter-ROM bank switching method is executed in units of pages. Assume that the 1-MB kanji ROM 19 is selected. In this case, as shown in FIG. 30, 16 pages (each consisting of 64 KB (Kbytes)) constituting the kanji ROM 19 are bank-switched in units of pages so that the 1-MB area is selectively referred to in units of pages. If the 512-KB dictionary ROM 20 is selected, 8 pages (each consisting of 64 KB) constituting the dictionary ROM 20 are bank-switched in units of pages. As a result, the 512-KB area is selectively referred to in units of pages. Similarly, if the 512-KB DOS ROM 21 is selected, 8 pages (each consisting of 64 KB) constituting the DOS ROM 21 are bank-switched in units of pages, and the 512-KB area is selectively referred to in units of pages, as shown in FIG. 31. If the application ROM 22 is selected, 32 pages (each consisting of 64 KB) constituting the application ROM 22 are bank-switched in units of pages, and the 2-MB area is selectively referred to in units of pages. If the expansion application ROM 36 is selected, 32 pages (each consisting of 64 KB) constituting the expansion application ROM 36 are bankswitched in units of pages, and the 2-MB area is selectively referred to.

FIG. 3 shows the hardware arrangement for performing the above-described inter-ROM bank switching method.

Referring to FIG. 3, a gate circuit 40 performs bank switching of each of the following ROMs: the kanji ROM 19, the dictionary ROM 20, the DOS ROM 21, the application ROM 22, and the expansion application ROM 36. The gate circuit 40 selects one of the above-mentioned ROMs (19, 20, 21, 22, and 36) in accordance with the enable signals E1 and E2 output from the bus controller 11A and the I/O port signals P37 and P36 output from the keyboard controller 27.

In this case, the enable signal E1 is a predetermined 1-bit output from an I/O register arranged in the bus controller 11A at address 70H, and the enable signal E2 is a predetermined 1-bit output from an I/O register arranged in the bus controller 11A at address 60H. The bit values of these I/O registers are set by the CPU 11.

The enable signal E1 indicates selection/non-selection of a first ROM group constituted by the kanji ROM 19, the application ROM 22, and the expansion application ROM 36. When the enable signal E1 is set at "1", the first ROM group is selected. When the enable signal E1 is set at "0", the first ROM group is set in a non-selected state.

The enable signal E2 indicates selection/non-selection of a second ROM group constituted by the dictionary ROM 20 and the DOS ROM 21. When the enable signal E2 is set at "1", the second ROM group is selected when the enable signal E2 is set at "0", the second ROM group is set in a non-selected state.

The I/O port signals P37 and P36 are output from I/O ports with port numbers P37 and P36 arranged in the keyboard controller 27. The output values from the I/O ports with port numbers P37 and P36 are set by the CPU 11. The I/O port signals P37 and P36 are used to determine which ROM of a selected ROM group is to be set in an enabled state.

As shown in FIG. 3, the gate circuit 40 is constituted by six 3-input AND gates G1 through G6 and six 2-input AND gates G11 through G16. The AND gate G1 receives the enable signal E1, the inverted signal of the I/O port signal P37, and the inverted signal of the I/O port signal P36. An output from the AND gate G1 is supplied, as an enable signal EN, to one input terminal of the AND gate G11. An output from the AND gate G7 is supplied to the other input terminal of the AND gate G11. When the HRAM window 12 or the backup RAM 18 is selected, the AND gate G7 supplies a logical "0" signal to the AND gate G11 and the AND gates G12 through G16 (to be described later), thereby disabling the AND gates G11 through G16. When a logical "1" signal is supplied from the AND gate G7 to the AND gate G11, i.e., when neither the HRAM window 12 nor the backup RAM 18 is selected, the AND gate G11 supplies the output from the AND gate G1, as an enable signal, to the kanji ROM 19.

The AND gate G2 receives the enable signal E1, the inverted signal of the I/O port signal P37, and the I/O port signal P36. An output from the AND gate G2 is supplied, to the AND gate G12, as the enable signal EN for a ROM block, in the application ROM 22, in which the wordprocessor application program is stored. Upon reception of a logical "1" signal from the AND gate G7, the AND gate G12 supplies the output from the AND gate G2, as the enable signal EN, to the application ROM 22.

The AND gate G3 receives the enable signal E1, the I/O port signal P37, and the inverted signal of the I/O port signal P36. An output from the AND gate G3 is supplied, to the AND gate G13, as the enable signal EN for a ROM block, in the application ROM 22, in which the spreadsheet application program is stored. Upon reception of a logical "1" signal from the AND gate G7, the AND gate G13 supplies the output from the AND gate G3, as the enable signal EN, to the application ROM 22.

The AND gate G4 receives the enable signal E2, the inverted signal of the I/O port signal P37, and the inverted signal of the I/O port signal P36. An output from the AND gate G4 is supplied, as the enable signal EN, to the dictionary ROM 20.

The AND gate G5 receives the enable signal E2, the inverted signal of the I/O port signal P37, and the I/O port signal P36. An output from the AND gate G5 is supplied, as the enable signal EN, to the AND gate G15. Upon reception of a logical "1" signal from the AND gate G7, the AND gate G15 supplies the output from the AND gate G4, as the enable signal EN, to the DOS ROM 21.

The AND gate G6 receives the enable signal E1, the I/O port signal P37, and the I/O port signal P36. An output from the AND gate G6 is supplied, to the AND gate G16, as the enable signal EN for a ROM block, in the expansion application ROM 36, in which an application program registered by the user is stored. Upon reception of a logical "1" signal from the AND gate G7, the AND gate G16 supplies the output from the AND gate G6, as the enable signal EN, to the expansion application ROM 36.

In order to select the HRAM window 12, index A2H is I/O-written at I/O port address EEH, and bit 7 of I/O port address EFH is set at "1". In order to designate a specific page of the HRAM window 12, index A1H is I/O-written at I/O port address EEH, and a page to be read (one of 256 pages) is designated at I/O port address EFH. Similarly, in order to select the backup RAM 18, index 5AH is I/O-written at I/O port address EOH.

Figure 4:
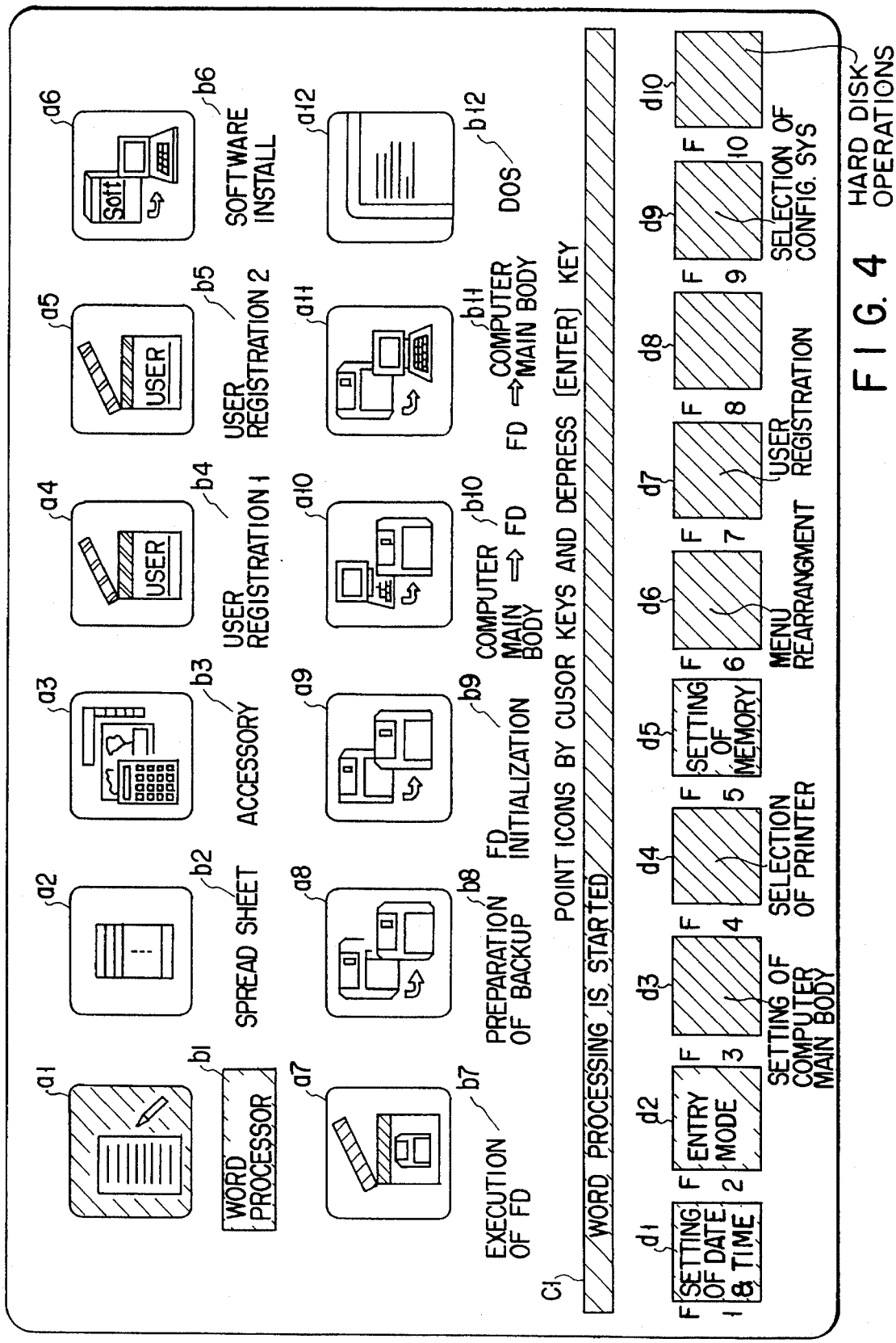
FIG. 4 is a view showing the arrangement of an initial menu screen in the first embodiment.

FIG. 4 shows the detailed arrangement of a menu screen displayed on the liquid crystal display 34 when the system is started by the DOS in the DOS ROM 21.

Referring to FIG. 4, reference symbols a1 through a12 denote menu icons for task selection. More specifically, reference symbol a1 denotes a wordprocessor icon for starting an existing wordprocessor application program of the application software incorporated in the system; and a2, a spreadsheet icon for starting an existing spreadsheet application program of the application software incorporated in the system. These icons are used to read out application programs stored in the application ROM 22. Reference symbol a3 denotes an accessory icon a3 for starting accessories such as a calendar, a calculator, a world timepiece, and the like. The application programs for the accessories can be stored in the HRAM window 12 in the process of icon registration. Reference symbols a4 and a5 denote user registration icons for registering and starting arbitrary software such as software stored in the expansion application ROM 36, software prepared by the user, or commercially available software; and a6, a software install icon for starting installation of arbitrary software such as commercially available software into the computer main body (the hard RAM (H-RAM) or the hard disk (HDD pack) 30).

Reference symbol a7 denotes an FD execution icon a7 for starting commercially available software supplied from a floppy disk (FD) (i.e., starting "autoexec.bat" of the FD); a8, a backup preparation icon for copying all the contents of a floppy disk to a new floppy disk (i.e., starting the "diskcopy" command); a9, an FD initialization icon for initializing a floppy disk (i.e., starting the "format" command); a10, a "computer main body→FD" icon for copying (backup copy) all the contents stored in the computer main body (the hard RAM (H-RAM) set in the main memory 12 or the hard disk 30) to floppy disks (i.e., starting the "allcopy" command for the hard RAM, and the "backup" command for the hard disk); .a11, an "FD→computer main body" icon for copying all the contents of a floppy disk to the computer main body (i.e., starting the "allcopy" command for the hard RAM, and the "backup" command for the hard disk); and a12, an MS-DOS icon for setting the MS-DOS stored in the DOS ROM 21 in a usable state (i.e., starting "command.com").

Reference symbols b1 through b12 denote icon titles displayed in correspondence with the icons a1 through a12.

Reference symbol c1 denotes a message line (title bar) for displaying the contents of an icon in a selected state, i.e., emphatically displayed, e.g., inverted-displayed.

Reference symbols d1 through d10 denote function display portions for displaying the functions of function keys F1 through F10 arranged on the keyboard 33. More specifically, the function display portion d1 displays the function of the function key F1 for setting date and time data in the CMOS memory of the real time clock 17; the function display portion d2, the function of the function key F2 for designating whether to set a kanji entry mode and an entry learning/non-learning mode; the function display portion d3, the function of the function key F3 for setting the computer main body in various modes, e.g., a resume mode, a speaker mode, a low-battery alarm mode, an automatic power-off mode, a screen inverted-display mode, and an automatic hard disk stop mode; the function display mode d4, the function of a function key F4 for selecting a type of printer driver; the function display portion d5, the function of a function key F5 for performing setting of a memory such as a hard RAM or an EMS; the function display portion d6, the function of a function key F6 rearranging the menu of icons $a_1$ through $a_{12}$ with their corresponding reference symbols b1 through b12; the function display portion d7, the function of the function key F7 for registering user's commands in "user registration 1"/"user registration 2" as menus; the function display portion d9, the function of the function key F9 for changing "config. sys" (environment setting file); and the function display portion d10, the function of the function key F10 for performing effective display only when the hard disk (HDD pack) 30 is mounted, thereby defining partitions of the hard disk and formatting it.

Figure 5:
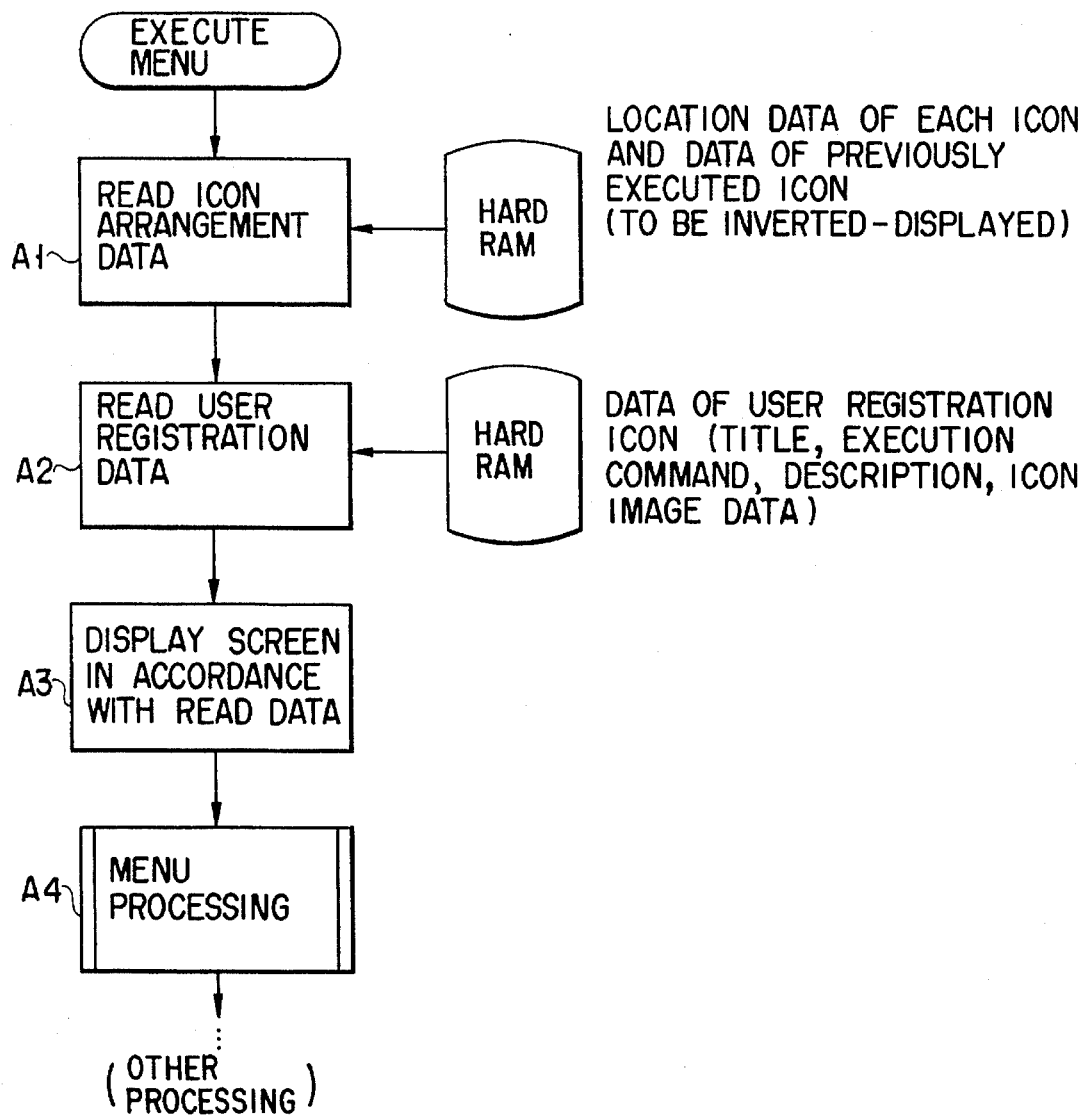
FIG. 5 is a flow chart showing a sequence for starting display of a menu screen in the first embodiment.
Figure 6:
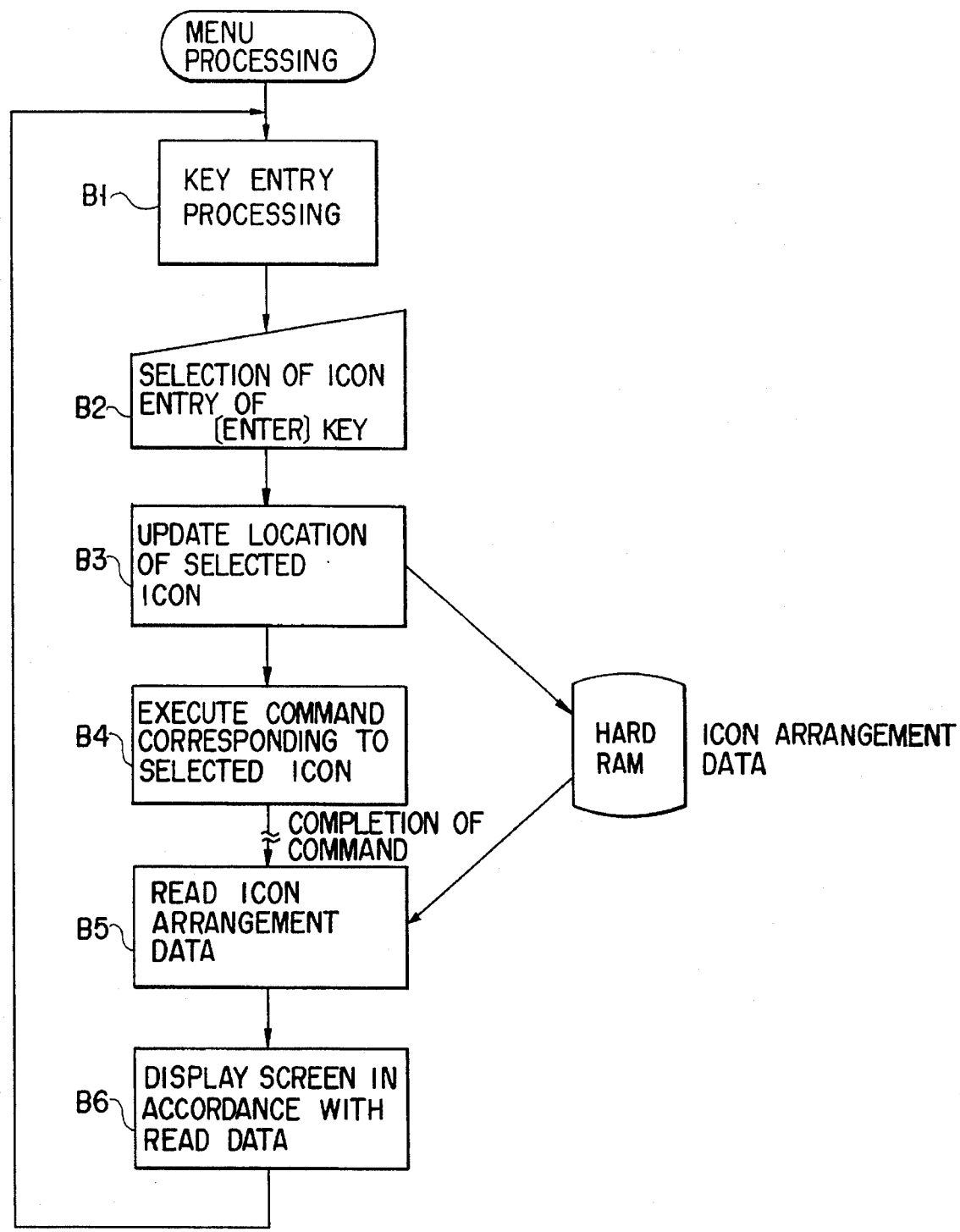
FIG. 6 is a flow chart showing a sequence for performing menu processing in step A4 in FIG. 5.

FIGS. 5 through 9 are flow charts showing menu display processing performed by the menu display processing program (P MENU) 21a stored in the DOS ROM 21. Of these drawings, FIGS. 5 and 6 are flow charts showing a display processing flow for the menu screen shown in FIG. 4. FIG. 5 is a flow chart showing a menu starting sequence. FIG. 6 is a flow chart showing a menu processing sequence in step A4 in FIG. 5.

Figure 7:
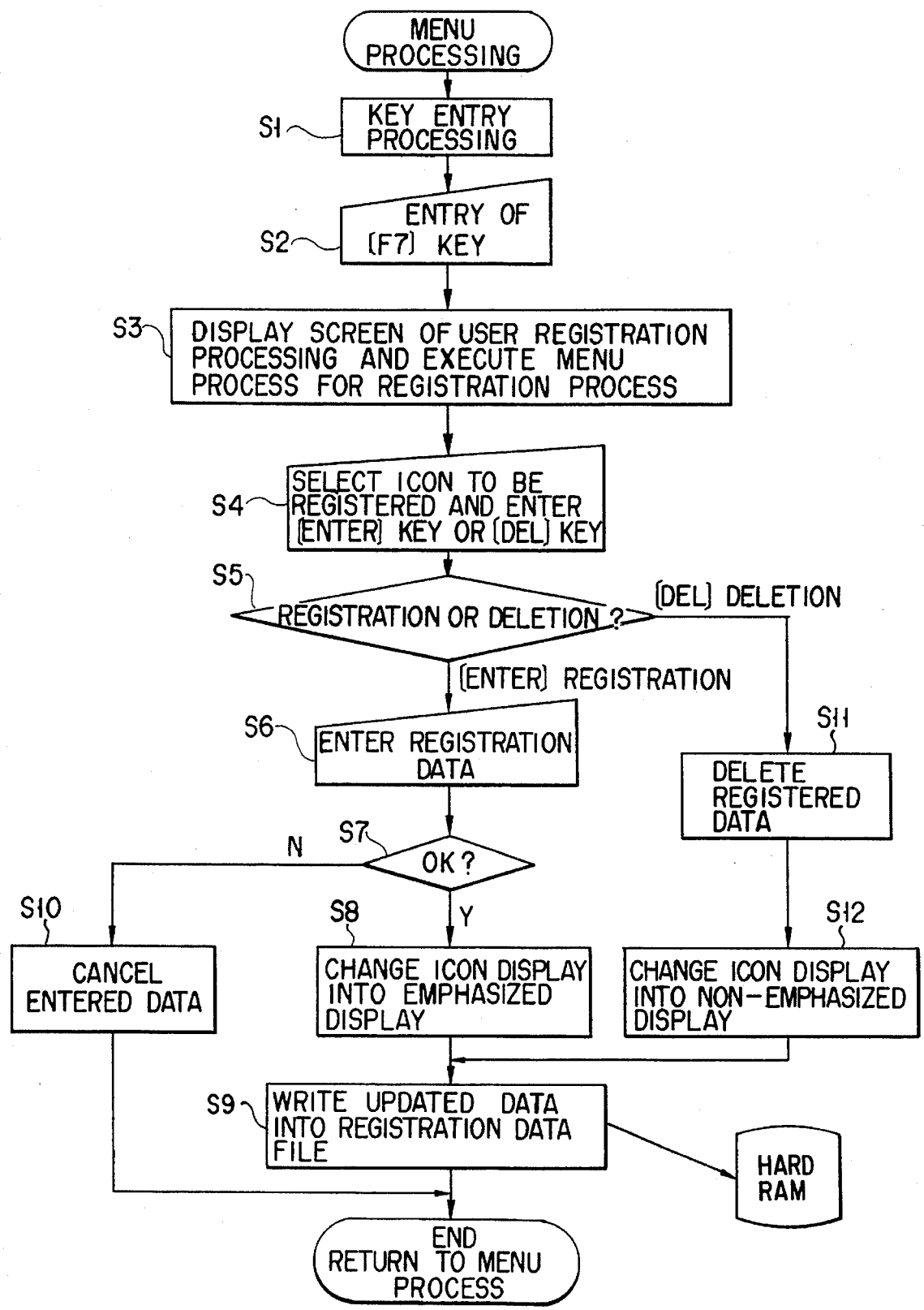
FIG. 7 is a flow chart showing a sequence for performing user registration when "USER REGISTRATION" is selected by operating a function key F7 on the menu screen shown in FIG. 4.
Figure 8:
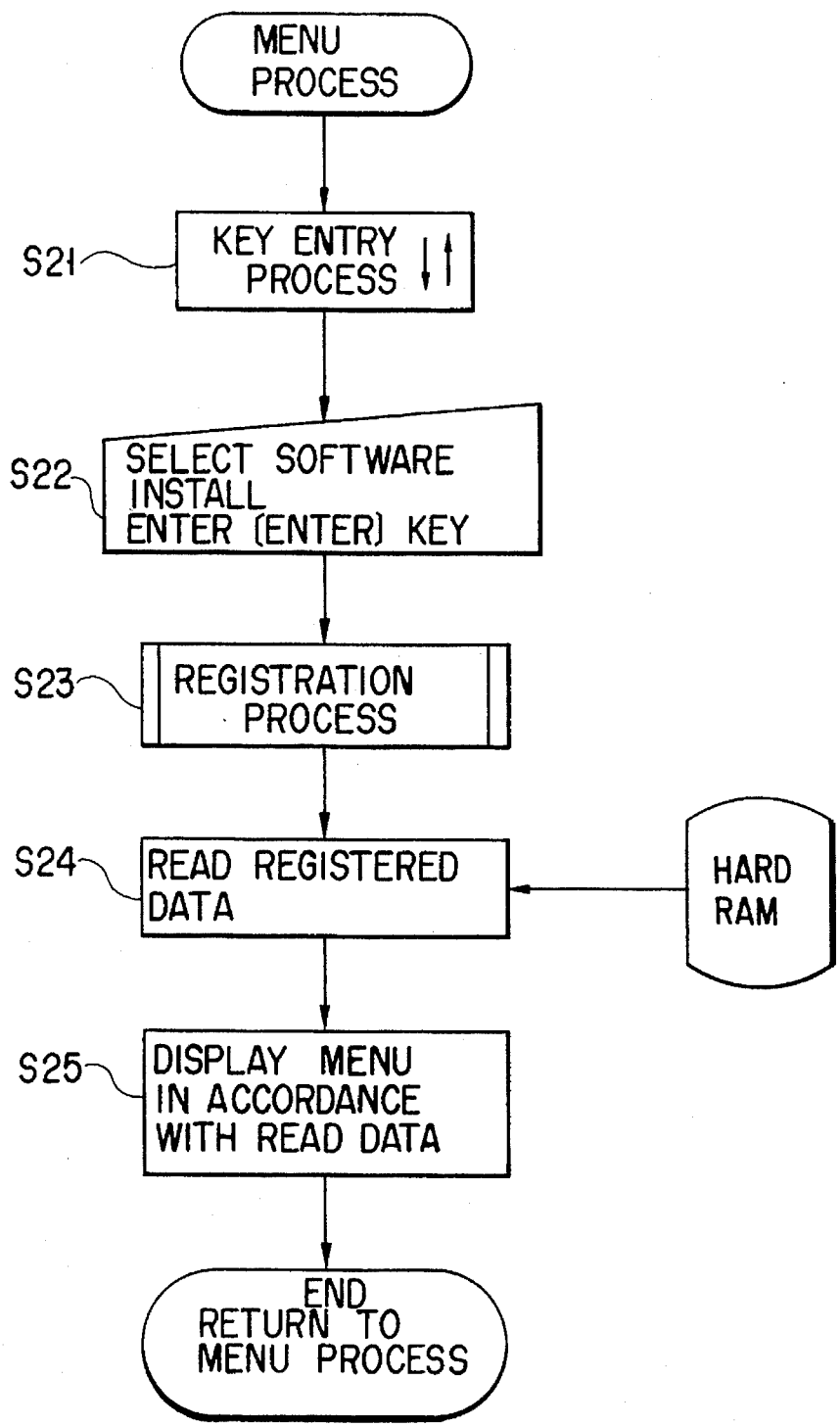
FIG. 8 is a flow chart showing a sequence for performing software install processing when a software install icon a6 is selected on the menu screen shown in FIG. 4.
Figure 9:
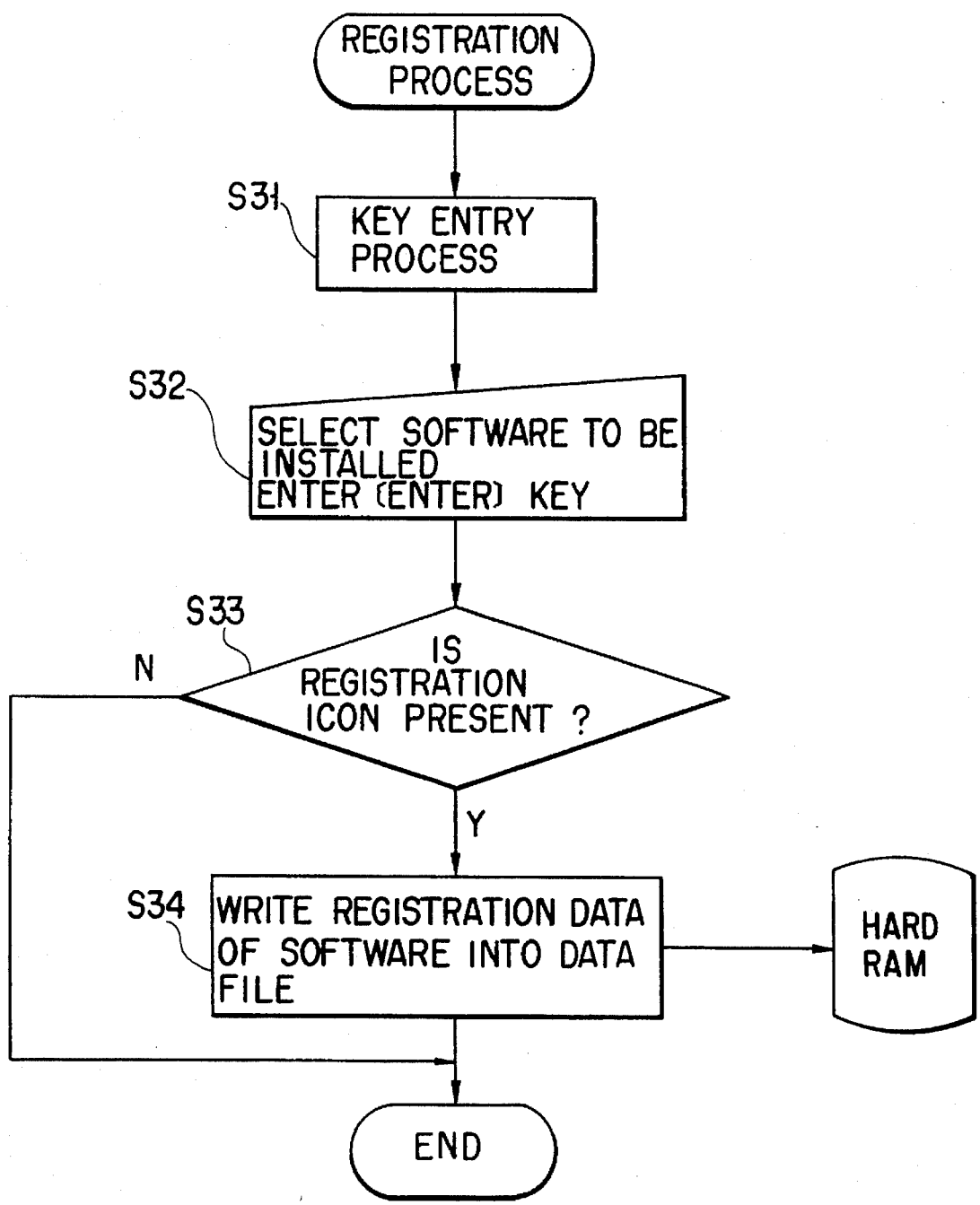
FIG. 9 is a flow chart showing a sequence for performing user registration processing in step S23 in FIG. 8.

FIGS. 7 through 9 are flow charts showing user registration processing in which software loaded in the computer main body is registered with icons in the user registration icons a4 and a5 on the menu screen shown in FIG. 4. FIG. 7 shows a user registration sequence to be performed when the "user registration" function is selected by the function key F7 on the menu screen shown in FIG. 4. In this user registration sequence, registration is arbitrarily performed by the user instead of performing registration by software install processing upon selection of the software install icon a6. FIGS. 8 and 9 show registration processing in which registration is automatically performed by software install processing upon selection of the software install icon a6.

That is, the user registration icons a4 and a5 are software execution icons for registering software stored in the expansion application ROM 36, software prepared by the user, commercially available software, and the like in the menu, and starting them. There are two methods of performing software registration in the user registration icons a4 and a5. In the first registration method, the function key F7 is operated on the menu shown in FIG. 4 to access the user registration function in the menu display processing program (P MENU) 21a, and an icon (a4 or a5) in which icon registration is to be performed is selected. The user then sets and registers arbitrary registration data. In the second registration method, the software install icon a6 is selected on the menu screen, and the software install program in the menu display processing program (P MENU) 21a is started. Registration data of the program is then automatically registered in a non-registered icon. FIG. 7 shows a sequence for the first registration method. FIGS. 8 and 9 show a sequence for the second registration method.

FIGS. 10 through 14 show the contents of user registration screens (windows) displayed by the execution of a user registration processing program included in the menu display processing program (P MENU) 21a upon selecting the user registration function by operating the function key F7 on the menu screen shown in FIG. 4 in accordance with the function display portion d7. Each of these screens is displayed in a predetermined area as a window on the menu screen shown in FIG. 4 at a lower left position (between the menu icons and the function display portions) in accordance with a processing stage. By performing a registration setting operation of software in accordance with the display contents of this window, the software copied to the computer main body can be registered in an icon on the menu. Upon registration, the icon is emphatically displayed.

FIG. 15 shows a display screen displaying a menu of software which can be installed. These software programs are read from software for software installation (a software install disk accompanying the system) in the process of executing the software install program of the menu display processing program (P MENU) 21a, which program is started upon selection of the software install icon a6 on the menu screen shown in FIG. 4. An operation of an embodiment of the present invention will be described below with reference to the above-described drawings.

When the system power is turned on, the CPU 11 executes an initialization processing routine stored in the system ROM 13. Upon confirming in the processing routine that the MS-DOS is not supplied from the floppy disk drive 31, the hard disk (HDD pack) 30, or the like, the CPU 11 automatically installs the DOS from the DOS ROM 21, incorporated as a standard unit in the computer main body, in the main memory 12. The CPU 11 then executes the menu display processing program (P MENU) 21a, stored in the DOS ROM 21, under the DOS. In practice, the computer is designed to allow two types of boot modes, i.e., the above-described mode, and the boot mode in which the DOS stored in the DOS ROM 21 is preferentially installed to start the system. A description of the latter mode will be omitted.

In this case, as shown in FIG. 2, the DOS ROM 21 is mapped in the common address space together with the kanji ROM 19, the dictionary ROM 20, the application ROM 22, and the expansion application ROM 36, and hence is selectively read-accessed by bank switching.

This inter-ROM bank switching is performed by hardware using the enable signals E1 and E2 set by the CPU 11 and output from the bus controller 11A, and the signals P36 and P37 output from I/O ports of the keyboard controller 27. When the enable signals E1 and E2 are respectively set at "0" and "1", and the I/O port signals P36 and P37 are respectively set at "1" and "0", the enable signal EN for ROM selection is output from the AND gate G5 of the gate circuit 40 to the DOS ROM 21, thereby allowing access control with respect to the DOS ROM 21.

Menu display processing performed by the menu display processing program (P MENU) 21a when the system is started by the DOS in the DOS ROM 21 will be described below with reference to the flow charts in FIGS. 5 through 9. Assume that a hard RAM is set in the main memory 12, and that a file containing menu display management data including menu icon display location data is stored in the hard RAM.

A starting operation for displaying a menu screen will be described first with reference to the flow chart in FIG. 5.

In a starting operation for displaying a menu screen, data required for the display of the menu screen, i.e., the location data of each icon, the data of a previously executed icon (to be inverted-displayed), icon title data, message line (description) data, and menu constituent data such as the function display portion data of each function key are loaded from the hard RAM set in the main memory 12 into the main memory 12 (step A1 in FIG. 4). After user registration icon data (e.g., title, execution command, description, and icon image data) are loaded (step A2 in FIG. 5), a menu screen such as the one shown in FIG. 4 is displayed in accordance with each data described above (step A3 in FIG. 5).

An icon corresponding to a task to be executed is selected on the menu screen, and menu processing is executed (step A4 in FIG. 5).

Menu processing to be executed in this case will be described below with reference to the flow chart in FIG. 6.

On the menu screen shown in FIG. 4, an icon corresponding to a task to be executed is selected by operating cursor keys and a confirmation key. Assume that the right cursor key is operated to sequentially shift icons inverted-displayed to the right, and [Enter] key as a confirmation key is operated after a target icon is inverted-displayed (steps B1 and B2 in FIG. 6).

Upon this icon selecting operation, the icon location data in the menu display management data file is updated in accordance with the location data of the selected icon, and the task corresponding to the selected icon is started. That is, when the [Enter] key for confirming icon selection is operated, the icon location data in the file is updated into the location data of the selected icon, and a command corresponding to the selected icon is executed (steps B3 and B4 in FIG. 6).

In the next menu display processing, the icon based on the updated icon location data is inverted-displayed as an initial target icon.

When the execution of the selected command is completed, the menu display processing program (P MENU) 21a is started again to display the menu screen shown in FIG. 4. In this case, the initial target icon is inverted-displayed on the basis of the updated icon location data in the file. That is, the icon corresponding to the command completed just now is inverted-displayed as an initial target icon (steps B5 and B6 in FIG. 6).

Icon registration in the user registration icons a4 and a5, which is performed to read out software stored in the expansion application ROM 36, or other software, will be described next with reference to FIGS. 7 through 9.

There are two registration methods. In the first registration method, the function key F7 is operated on the menu screen shown in FIG. 4 to access the user registration function in the menu display processing program (P MENU) 21a, and an arbitrary icon (a4 or a5) in which icon registration is to be performed is selected. The user then sets and registers arbitrary registration data. In the second registration method, the software install icon a6 is selected on the menu screen, and the software install program in the menu display processing program (P MENU) 21a is started. Registration data of the program is then automatically registered in a non-registered icon. A sequence based on the first registration method will be described with reference to FIG. 7. A sequence based on the second registration method will be described with reference to FIGS. 8 and 9.

When the function key F7 is operated on the menu screen shown in FIG. 4 (steps S1 and S2 in FIG. 7), the screen shown in FIG. 10 is displayed in the predetermined window area, which screen indicates a choice between the user registration icons a4 and a5 as an icon to be registered, and a choice between "REGISTRATION/CHANGE" and "DELETE" (step S3 in FIG. 7).

When a target icon is selected, and the [Enter] key is operated to designate "registration", the title setting screens shown in FIGS. 11 through 14 are sequentially displayed in the same area for each setting operation (steps S4 through S6 in FIG. 7).

When a title is input and confirmed, as shown in FIG. 12, the file name setting screen (shown in FIG. 13) for setting a file name for starting the software is displayed in the same area. When a file name is input and confirmed, the description entry screen shown in FIG. 14 is displayed on the same area to enter a description to be displayed in the message line (title bar) c1.

When each setting is completed and checked, and the Enter] key is operated to confirm the set contents of user registration, the selected user registration icon (a4 or a5) is emphatically displayed as a registered icon. In addition, the contents of the file containing the menu display management data are updated in accordance with the set data (steps S7 through S9 in FIG. 7).

Assume that a [Del] key for designating "DELETE" is operated on the screen (shown in FIG. 10) for selecting a target icon. In this case, the data registered in the selected user registration icon (a4 or a5) is deleted from the file, and the user registration icon (a4 or a5) is restored to a display state indicating a unused state (non-emphasized display) (steps S11 and S12 in FIG. 7).

If each of the above-described setting operations is completed and checked, and the [Enter] key is operated, all the entered data are deleted (canceled), and the current screen is restored to the menu screen shown in FIG. 4 (step S10 in FIG. 7).

The second registration method will be described next with reference to FIGS. 8 and 9. In this method, the software install icon a6 is selected on the menu screen, and the software install program of the menu display processing program (P MENU) 21a is started to automatically register the registration data of the program in a non-registered icon.

When the software install icon a6 is selected on the menu screen, and the [Enter] key is operated, the processing shown in FIG. 9 is started (steps S21 through S23 in FIG. 8).

Upon completion of this processing, the updated contents of the file are reflected in the menu screen shown in FIG. 4, and the software selected by the processing shown in FIG. 9 is automatically registered with a non-registered icon (steps S24 and S25 in FIG. 8).

In the software install registration processing shown in FIG. 9, a menu of software which can be installed is displayed according to the format shown in FIG. 15. These software programs are loaded from the software for software installation (the software install disk accompanying the system). One software program to be selected is selected on this screen, and the [Enter] key is operated (steps S31 and S32 in FIG. 9). As a result, the presence/absence of a non-registered icon is checked (step S33 in FIG. 9). If the presence of a non-registered icon is confirmed, data associated with the selected software, e.g., an icon title, an execution command, the description of the command, and the file name of an icon file, are registered in the file. This data is then reflected in the non-registered icon so that the non-registered icon is changed into a registered icon in accordance with the above-mentioned icon data (step S34 in FIG. 9).

In this case, if icon image data is included in the icon data, an icon pattern based on the image data is displayed.

An inter-ROM bank switching operation performed by the gate circuit 40 in FIG. 3 will be described in more detail next with reference to FIGS. 17 and 18.

FIG. 17 shows the relationship between ROM block selection of the first ROM group and the I/O port signals P37 and P36. When the logical "1" enable signal (in an active state) is output from the I/O register at address 70H, the first input of each of the AND gates G1 through G3 and G6 is set at "1", thus selecting the first ROM group. If both the I/O port signals P37 and P36 are at "0" in this state, the logical "1" enable signal EN is output from the AND gate G1 through the AND gate G11 to select the kanji ROM 19. That is, when the kanji ROM 19 is to be accessed, the CPU 11 sets "1" and "0" in the register at address 70H and the register at address 60H of the bus controller 11A, respectively, and sets both the I/O ports P37 and P36 of the keyboard controller 27 at "0".

when the I/O port signals P37 and P36 are set at "0" and "1", respectively, the logical "1" enable signal EN is output from the AND gate G2 through the AND gate G12, thus selecting a ROM block, in the application ROM 22, in which the wordprocessor application program is stored. Similarly, when the I/O port signals P37 and P36 are at "1" and "0", respectively, the logical 1" enable signal EN is output from the AND gate G3 through the AND gate G13 to select a ROM block, in the application ROM 22, in which the spreadsheet application program is stored. That is, when the ROM block, in the application ROM 22, in which the wordprocessor application program is stored is to be accessed, the CPU 11 sets "1" and "0" in the register at address 70H and the register at address 60H of the bus controller 11A, respectively, and sets the I/O ports P37 and P36 of the keyboard controller 27 at "0" and "1", respectively. Similarly, when the ROM block in which the spreadsheet application program is stored is to be accessed, the CPU 11 sets "1" and "0" in the register at address 70H and the register at address 60H of the bus controller 11A, respectively, and sets the I/O port P37 and P36 of the keyboard controller 27 at "1" and "0", respectively, when both the I/O port signals P37 and P36 are at "1", the logical 1" enable signal EN is output from the AND gate G6 through the AND gate G16 to select the expansion application ROM 36. That is, when the expansion application ROM 36 is to be accessed, the CPU 11 sets "1" and "0" in the register at address 70H and the register at address 60H of the bus controller 11A, respectively, and sets both the I/O ports P37 and P36 of the keyboard controller 27 at "0".

FIG. 18 shows the relationship between ROM block selection of the second ROM group and the I/O port signals P37 and P36. When the logical 1" enable signal E2 (in an active state) is output from the I/O register at address 60H, the first input of each of the AND gates G4 and G5 is set at "1". As a result, the second ROM group is selected. When both the I/O port signals P37 and P36 are set at "0" in this state, the logic-"1" enable signal EN is output from the AND gate G4 through the AND gate G14 to select the dictionary ROM 20. When the I/O port signals P37 and P36 are set at "1" and "0", respectively, the logical "1" enable signal EN is output from the AND gate G5 through the AND gate G15 to select the DOS ROM 21. That is, when the dictionary ROM 20 is to be accessed, the CPU 11 sets "0" and "1" in the register at address 70H and the register at address 60H of the bus controller 11A, respectively, and sets both the I/O ports P37 and P36 of the keyboard controller 27 at "0". Similarly, when the DOS ROM 21 is to be accessed, the CPU 11 sets "0" and "1" in the register at address 70H and the register at address 60H of the bus controller 11A, respectively, and sets the I/O ports P37 and P36 of the keyboard controller 27 at "1" and "0", respectively.

In this manner, the kanji ROM 19, the dictionary ROM 20, the DOS ROM 21, the application ROM 22 (having the ROM block for storing the wordprocessor application program, and the ROM block for storing the spreadsheet application program), and the expansion application ROM 36, all of which are allocated to the same address space, are switched by the values set in the registers at address 70H and address 60H, and the values of the I/O ports of the keyboard controller 27 so as to be selectively used.

A sequence for starting the operating system will be described next with reference to the flow chart in FIG. 19.

When the power switch of the system is turned on, a startup program in the system ROM 13 is started by the CPU 11. First, the CPU 11 performs reliability tests for hardware such as controller LSIs and memories, and initializes them (steps S41 and S43). In the initialization processing, initialization is performed in accordance with the system configuration data held in the real time clock 17. The CPU 11 then checks the check sum of the DOS ROM 21 (step S45), and performs connection checks and initialization with respect to the hard disk pack 30 and the floppy disk drive 31 (steps S45, S47, and S49). In this initialization processing, the hard disk pack 30 and the floppy disk drive 31 are initialized in accordance with the system configuration data held in the real time clock 17.

When such reliability tests and initialization are completed, loading of the operating system (DOS) is executed as follows. First, the CPU 11 loads the system configuration data held in the real time clock 17 and checks whether "EXECUTION OF DOS=DOS ROM" is set. If "EXECUTION OF DOS=DOS ROM" is set, the CPU 11 starts the disk driver BIOS (INT13H), stored in the expansion memory 23, with device number 81H in order to load the operating system from the DOS ROM 21 (step S53). This device number 81H indicates the DOS ROM 21.

First, the BIOS (INT13H) changes the values of the registers at address 60H and address 70H of the bus controller 11A to "1" and "0", respectively, in order to switch the ROM allocated to address "0E0000H" through address "0F0000H" to the DOS ROM 21. The BIOS (INT13H) then changes the I/O port signals P37 and P36 of the keyboard controller 27 to "1" and "0", respectively. The BIOS (INT13H) loads a boot program written at a predetermined position in the DOS ROM 21 into a system memory area of the main memory 12, and transfers control to the boot program. The CPU 11 starts the boot program to load the system file of the DOS from the DOS ROM 21 into the system memory area of the main memory 12, and starts the operating system (step S55). Since the menu display program is stored, as an automatic execution batch file, in the DOS ROM 21, as described above, the automatic execution batch file is loaded first from the DOS ROM 21 when the operating system is started. As a result, menu display processing is automatically executed, as described with reference to FIG. 6 (step S57).

If the system configuration data is set such that "EXECUTION OF DOS=FDD/HDD", the CPU 11 executes the disk driver BIOS (INT13H) in the order of device numbers 00H, 01H, 80H, and 81H (step S59). In this case, device numbers 00H and 01H indicate the floppy disk drives 31 (two FDDs); device number 80H, the hard disk pack 30 or the hard RAM; and device number 81H, the DOS ROM 21.

As a result, the CPU 11 searches the floppy disk drive (FDD) 31, the hard disk (HDD pack) 30, the hard RAM, and the DOS ROM 21, in the order named, for the operating system (DOS), thus executing boot processing (step S61). If the operating system is located in the floppy disk drive (FDD) 31, the hard disk (HDD pack) 30, or the hard RAM, the operating system is started in a normal manner. Otherwise, the operation system from the DOS ROM 21 is started to automatically display the menu screen (step S57).

As described above, the order of boot processing is switched between execution from the DOS ROM 21 or execution in the order of the FDD controller 24, the hard disk (HDD pack) 30, the hard RAM, and the DOS ROM 21 in accordance with the setting of the system configuration data.

FIG. 20 shows a setup screen for setting system configuration data.

As shown in FIG. 20, the system configuration data includes data associated with the order of execution of the DOS and the like as well as data associated with a memory capacity, a display, an FDD/printer, a hard disk, communication, a power save function, and the like.

"EXECUTION OF DOS=DOS ROM" indicates that boot processing for executing the operating system (DOS) is started from the DOS ROM 21. "EXECUTION OF DOS=DOS ROM" is set as a default value. If, therefore, the power is turned on with this default value kept unchanged, booting is performed first from the DOS ROM 21, and the operating system (DOS) from the DOS ROM 21 is executed to display the menu screen.

If the above default value is changed into "EXECUTION OF DOS=FDD/HDD" by the user, as indicated by the parentheses, booting is executed in the order of the floppy disk drive (FDD) 31, the hard disk pack 30, the hard RAM, and the DOS ROM 21.

Boot processing, therefore, can be efficiently performed by setting "EXECUTION OF DOS=FDD/HDD" when the operating system is to be installed from a floppy disk as in a normal operation, and by setting "EXECUTION OF DOS=DOS ROM" when the operating system in the DOS ROM 21 is to be used.

As described above, in the portable computer of this embodiment, since the operating system and the application programs are respectively stored in the DOS ROM 21 and the application ROM 22 in advance, the operating system and the application programs can be executed without install processing from floppy disks. Therefore, a target program can be quickly started regardless of the presence/absence of a built-in hard disk drive, and a portable computer with sufficiently high operability can be obtained at a relatively low cost.

In this embodiment, when the operating system from the DOS ROM 21 is started, the menu screen in FIG. 4 is automatically displayed to allow the user to select/designate various functions and programs (DOS, wordprocessor, and spreadsheet programs) on the menu screen. That is, designed functions and programs can be executed by only selecting/designating corresponding icons on the menu screen. Therefore, the user need not perform a cumbersome operation, e.g., installing a desired program from floppy disks upon selecting it from a menu, as in the prior art.

In addition, the DOS ROM 21 and the application ROM 22 are allocated to the same address space together with the kanji ROM 19, and are selectively used by inter-ROM bank switching. For this reason, the installation of the DOS ROM 21 and the application ROM 22 requires no additional memory address space. Therefore, an improvement in operability can be achieved while the compatibility with conventional systems is maintained.

As an address space to which the DOS ROM 21 and the application ROM 22 are allocated, an unused area in a memory map may be used. Alternatively, an address space allocated to a memory other than the kanji ROM 19 may be used as long as the common use of the space is allowed by bank switching.

The second embodiment of the present invention will be described next with reference to FIG. 21. The third embodiment is the same as the first embodiment except for the operating system starting sequence (shown in FIG. 19) at the time when the power is turned on.

The starting sequence in the second embodiment is designed to switch the order of boot processing by only depressing a function key (F10), and includes the step of checking, before system configuration data is loaded, whether the function key (F10) is depressed.

Figure 19:
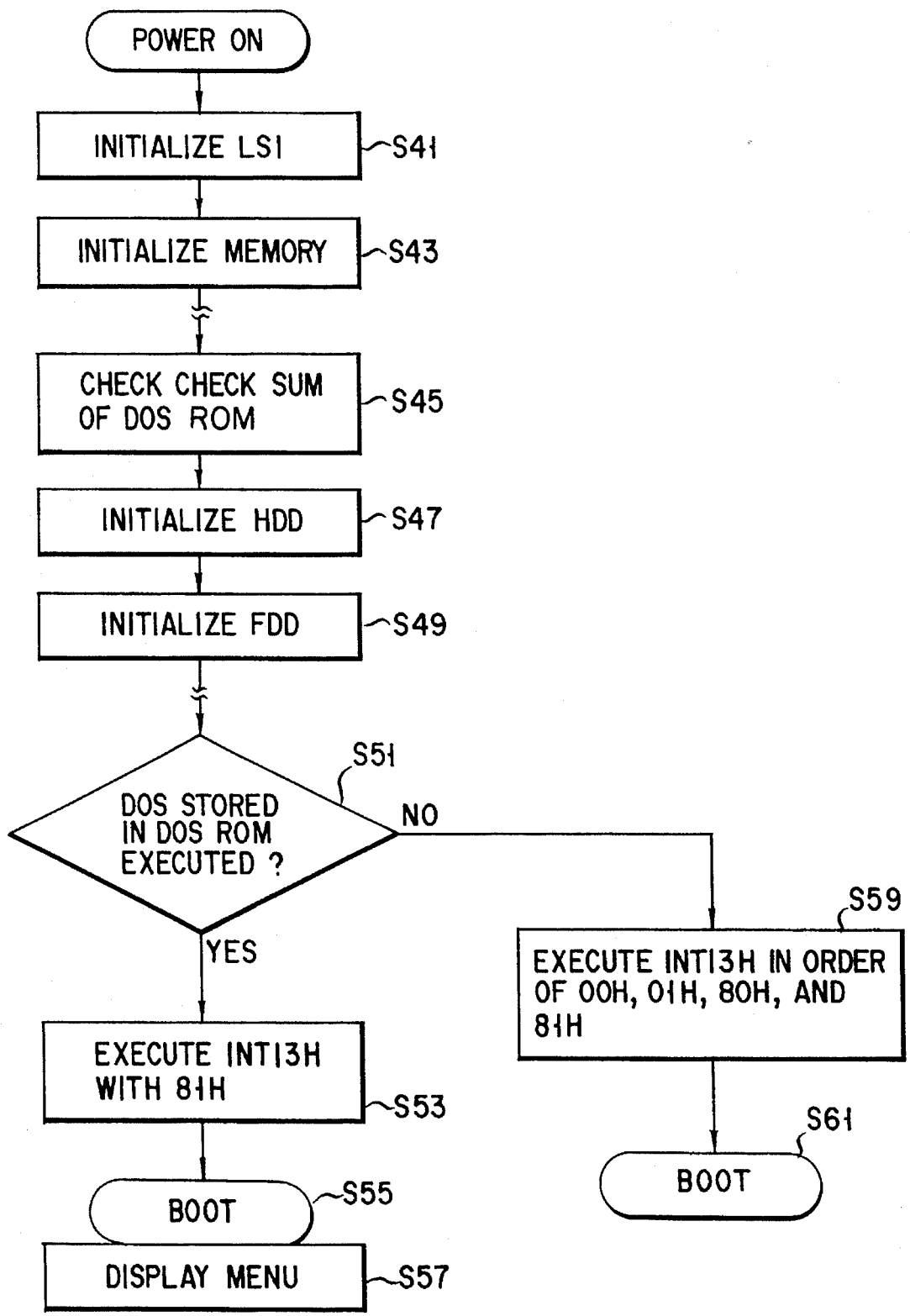
FIG. 19 is a flow chart for explaining an operation to be performed when the system is started in the first embodiment.

As shown in FIG. 21, in this starting processing, when the power is turned on, a startup program in a system ROM 13 is started by a CPU 11 to perform reliability tests and initialization with respect to hardware, memories, an FDD, and an HDD, similar to the processing shown in FIG. 19 (steps S71 to S75). When the reliability tests and initialization are completed, an operating system (DOS) loading operation is executed.

In this case, the CPU 11 checks whether the function key F10 of a keyboard 33 is depressed (step S81). Assume that the function key F10 is not depressed. In this case, similar to the processing in FIG. 19, boot processing is executed from a DOS ROM 21 if the system configuration data in a real time clock 17 is set such that "EXECUTION OF DOS=DOS ROM" (steps S83 through S89), whereas boot processing is executed in the order of a floppy disk drive 31, the hard disk pack 30, a hard RAM, and the DOS ROM 21 if "EXECUTION OF DOS=FDD/HDD" (steps S83, S93, and S95).

If the function key F10 is depressed, boot processing is performed in the reverse order to that set by the system configuration data. More specifically, when the system configuration data in the real time clock 17 is set such that "EXECUTION OF DOS = FDD/HDD", the CPU 11 executes boot processing from the DOS ROM 21 (steps S91, S85, S87, and S89). If the system configuration data in the real time clock 17 is set such that "EXECUTION OF DOS=DOS ROM", the CPU 11 executes boot processing in the order of the floppy disk drive 31, the hard disk pack 30, the hard RAM, and the DOS ROM 21 (steps S91, S93, and S95).

As described above, in the second embodiment, the order of boot processing can be easily switched from the current set state to another state by only depressing the function key F10. Therefore, switching between an operation of starting the operation system supplied from a floppy disk and an operation of starting the operating system in the DOS ROM 21 can be easily performed without changing the system configuration data, achieving a further improvement in operability.

The third embodiment of the present invention will be described next with reference to FIGS. 22 and 23. The third embodiment is the same as the first embodiment except that the existence of a DOS ROM 21 can be nullified.

In the first embodiment, one of two device numbers 80H and 81H (81H in the first embodiment) which are to be allocated to the hard disk or the hard RAM is always allocated to the DOS ROM 21. For this reason, only device number 80H can be allocated to the hard disk or the hard RAM. In this case, if the hard disk is allocated to the device number 80H, the hard RAM cannot be used. In order to eliminate such an inconvenience, in the third embodiment, whether the DOS ROM 21 is used or not can be designated by the user. If the DOS ROM 21 is not used, device number 81H can be allocated to the hard RAM.

FIG. 22 shows a setup screen used in the third embodiment. In addition to the items of the setup screen in FIG. 8, this setup screen includes configuration data "DOS ROM= USED (NOT USED)" for designating whether to use the DOS ROM 21.

"DOS ROM=USED" is set as default data. As described in the first embodiment, device number 81H is allocated to the DOS ROM 21. If this configuration data is changed to "DOS ROM=NOT USED", the existence of the DOS ROM 21 is neglected, and the hard RAM can be set at device number 81H.

FIG. 23 shows an initialize routine for allocating such device numbers. A startup program, which is started when the power switch is turned on, performs reliability tests with respect to hardware such as controller LSIs, and memories, and refers to the system configuration data held in a real time clock 17 to check whether "DOS ROM=USED" is set (step S101). If "DOS ROM=USED" is set, similar to the first embodiment, device number 00H (prompt A) and 01H (prompt B) are allocated to a floppy disk drive 31; device number 80H (prompt C), to a hard disk pack 30 or a hard RAM; and device number 81H (prompt D), to the DOS ROM 21 (step S103).

If "DOS ROM=NOT USED" is set, the DOS ROM 21 is neglected, device number 80H (prompt C) and device number 81H (prompt D) are respectively allocated to the hard disk pack 30 and the hard RAM (step S105).

As described above, in the third embodiment, whether device number 81H is allocated to the DOS ROM 21 or is released to the hard disk pack 30 or the hard RAM can be selected by properly setting system configuration data. Therefore, a system configuration can be easily set in accordance with the application of the portable computer.

The fourth embodiment of the present invention will be described below with reference to FIGS. 24 and 25. In the fourth embodiment, the contents of a system configuration file (CONFIG.SYS) as environment setting data for the portable computer can be updated.

The contents of a DOS ROM 21 cannot be updated. For this reason, in general, if the operating system in the DOS ROM 21 is started, the environment of the operating system is uniquely determined by a standard system configuration file (CONFIG.SYS) written in the DOS ROM 21. If, therefore, the operating system in the DOS ROM 21 is started, the type of printer to be used and the use environment of the memory cannot be changed. In order to eliminate such an inconvenience, in the fourth embodiment, the system configuration file (CONFIG.SYS) is set not only in the DOS ROM 21 but also in a backup RAM 18 so that the standard system configuration file (CONFIG.SYS) in the DOS ROM 21 and the system configuration file (CONFIG.SYS) in the backup RAM 18 can be selectively used in accordance with the designation of the user.

FIG. 24 shows a setup screen used in the fourth embodiment. In addition to the items of the setup screen in FIG. 22, this setup screen includes configuration data "CONFIG.SYS=DOS ROM (BACKUP RAM)" for designating which one of the system configuration files (CONFIG.SYS) in the DOS ROM 21 and the backup RAM 18 is used.

"CONFIG.SYS=DOS ROM" is normally set as default data, and hence the environment of the operating system is determined by the standard system configuration file (CONFIG.SYS) in the DOS ROM 21. If this configuration data is changed to "CONFIG.SYS=BACKUP RAM" by the user, the system configuration file (CONFIG.SYS) in the backup RAM 18 is loaded in a system memory area, instead of the system configuration file in the DOS ROM 21. The environment of the system configuration file (CONFIG.SYS) is determined by the loaded system configuration file (CONFIG.SYS).

FIG. 25 shows a DOS ROM (21) read routine for selectively using the system configuration files (CONFIG.SYS) in the DOS ROM 21 and the backup RAM 18. This read routine is executed when the BIOS (INT13H) is started with device number 81H upon starting the operating system in the DOS ROM 21. More specifically, in the read routine, a CPU 11 checks a read address (a track number, a sector number, and a head number) with respect to the DOS ROM 21, which address is supplied from a startup program or the boot program or system file of the operating system, and determines whether the address coincides with the preset address of the system configuration file (CONFIG.SYS) (step S111). If the address does not coincide with the address of the system configuration file (CONFIG.SYS), the CPU 11 reads out data corresponding to the address from the DOS ROM 21 (step S115), and transfers it to the system memory area of a main memory 12 (step S119).

If the read address with respect to the DOS ROM 21 coincides with the preset address of the system configuration file (CONFIG.SYS), the CPU 11 loads the system configuration data stored in a real time clock 17, and checks whether "CONFIG.SYS=BACKUP RAM" is set (step S113). If "CONFIG.SYS=DOS ROM" is set, the CPU 11 reads out the standard system configuration file (CONFIG.SYS) from the DOS ROM 21 (step S115), and transfers it to the system memory area of the main memory 12 (step S119). As a result, the operating system in the DOS ROM 21 is executed under the environment determined by the standard system configuration file (CONFIG.SYS).

If "CONFIG.SYS=BACKUP RAM" is set, the CPU 11 reads out the system configuration file (CONFIG.SYS) from the backup RAM 18 (step S117), and transfers it to the system memory area of the main memory 12 (step S119). As a result, the operating system in the DOS ROM 21 is executed under the environment determined by the system configuration file (CONFIG.SYS) set in the backup RAM 18. If, therefore, a new system configuration file (CONFIG.SYS) from a floppy disk is registered in the backup RAM 18, and the power is turned on upon setting "CONFIG.SYS=BACKUP RAM", a new environment can be set by the new system configuration file (CONFIG.SYS).

Registration of the system configuration file (CONFIG.SYS) in the backup RAM 18 and the function of selecting the system configuration file (CONFIG.SYS) to be used can be designated on the menu screen shown in FIG. 4.

Figure 26:
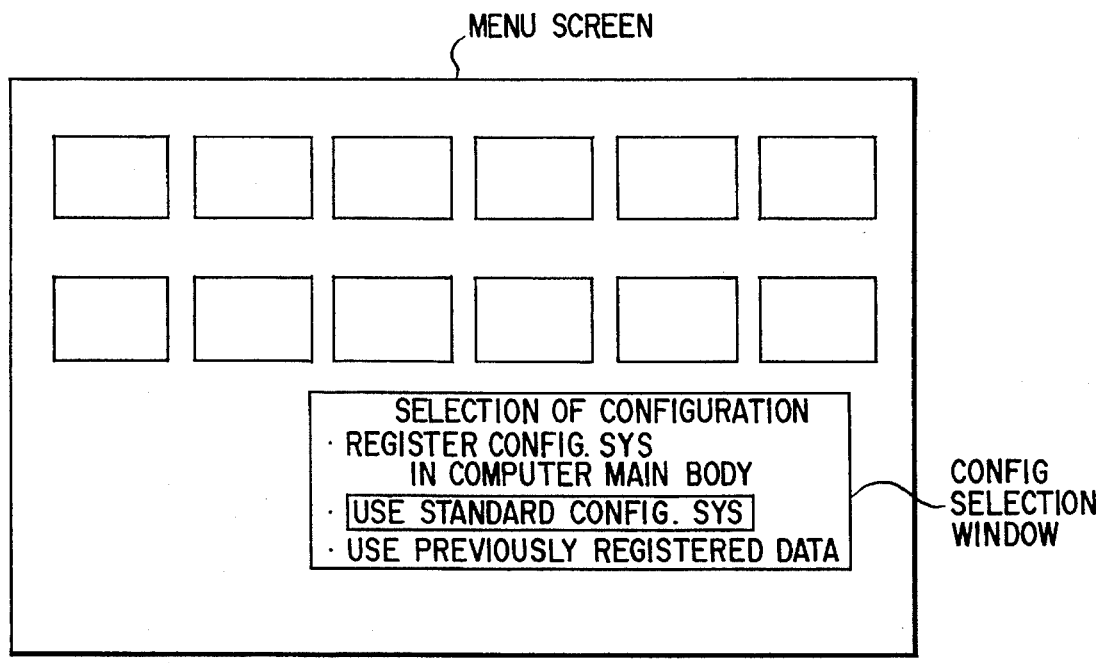
FIG. 26 is a view showing item data for selection of a system configuration file, which data is displayed in a window on a menu screen of the portable computer of the fourth embodiment.

When a function key F9 is depressed on the menu screen, a configuration selection window 100 is displayed, as shown in FIG. 26. The window 100 includes three messages, i.e., "REGISTER CONFIG.SYS IN COMPUTER MAIN BODY", "USE STANDARD CONFIG.SYS", and "USE PREVIOUSLY REGISTERED DATA". The message "REGISTER CONFIG.SYS IN COMPUTER MAIN BODY" indicates a function item for registering a system configuration file (CONFIG.SYS) to be newly registered from a floppy disk in the backup RAM 18. When this item is selected, and the floppy disk is inserted in the floppy disk drive 31, a new system configuration file (CONFIG.SYS) is written from the floppy disk into the backup RAM 18. The message "USE STANDARD CONFIG.SYS" indicates a function item for selecting the standard system configuration file (CONFIG.SYS) written in the DOS ROM 21. This function item is normally selected as default data. The message "USE PREVIOUSLY REGISTERED DATA" indicates a function item for selecting the system configuration file (CONFIG.SYS) registered in the backup RAM 18. If this item is selected, the system configuration data is set such that "CONFIG.SYS=BACKUP RAM", and the backup RAM 18 is selected when the system configuration file (CONFIG.SYS) is read.

Figure 27:
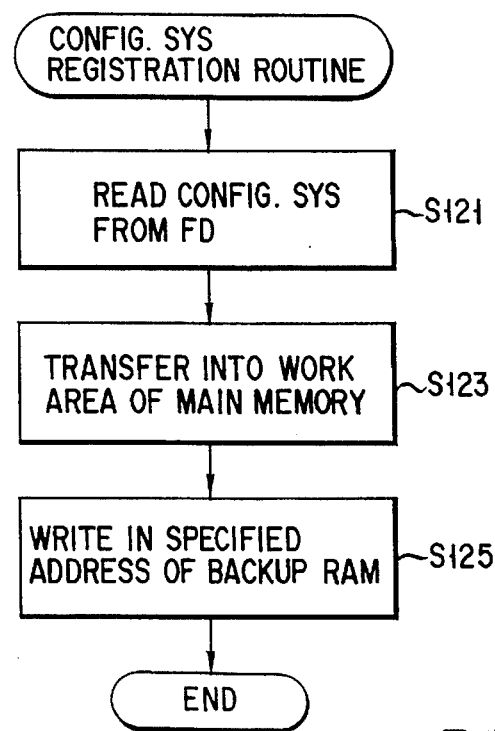
FIG. 27 is a flow chart for explaining registration of the system configuration file in the fourth embodiment.

FIG. 27 shows a sequence for registering a system configuration file (CONFIG.SYS) in the backup RAM 18.

When a new system configuration file (CONFIG.SYS) is to be registered, the BIOS program (INT13H) in a system ROM 13 is started by the CPU 11. The CPU 11 reads the system configuration file (CONFIG.SYS) from the floppy disk, and transfers it to the main memory 12 (steps S121 and S123). The system configuration file (CONFIG.SYS) is then written at a predetermined address in the backup RAM 18 by the CPU 11 (step S125).

As described above, in the fourth embodiment, the standard system configuration file (CONFIG.SYS) in the DOS ROM 21 and the system configuration file (CONFIG.SYS) in the backup RAM 18 can be selectively used in accordance with the designation of the user. Therefore, even if the operating system in the DOS ROM 21 is used, the system environment can be changed.

The fifth embodiment of the present invention will be described next with reference to FIGS. 28 and 29. In the fifth embodiment, if there is a bug in an operating system in a DOS ROM 21, the contents of the operating system can be automatically corrected.

The contents of the DOS ROM 21 cannot be updated. For this reason, if there is a bug in the operating system in the DOS ROM 21, the DOS ROM 21 must be replaced. As described above, the DOS ROM 21 is constituted by a mask ROM. It takes a relatively long period of time to re-program the mask ROM. During this period, the user cannot perform an operation by using the DOS ROM 21.

In the fifth embodiment, while the operating system is loaded, patch processing can be automatically executed by the BIOS (INT13H) for loading the operating system from the DOS ROM 21 into the system memory of a main memory 12.

Figure 28:
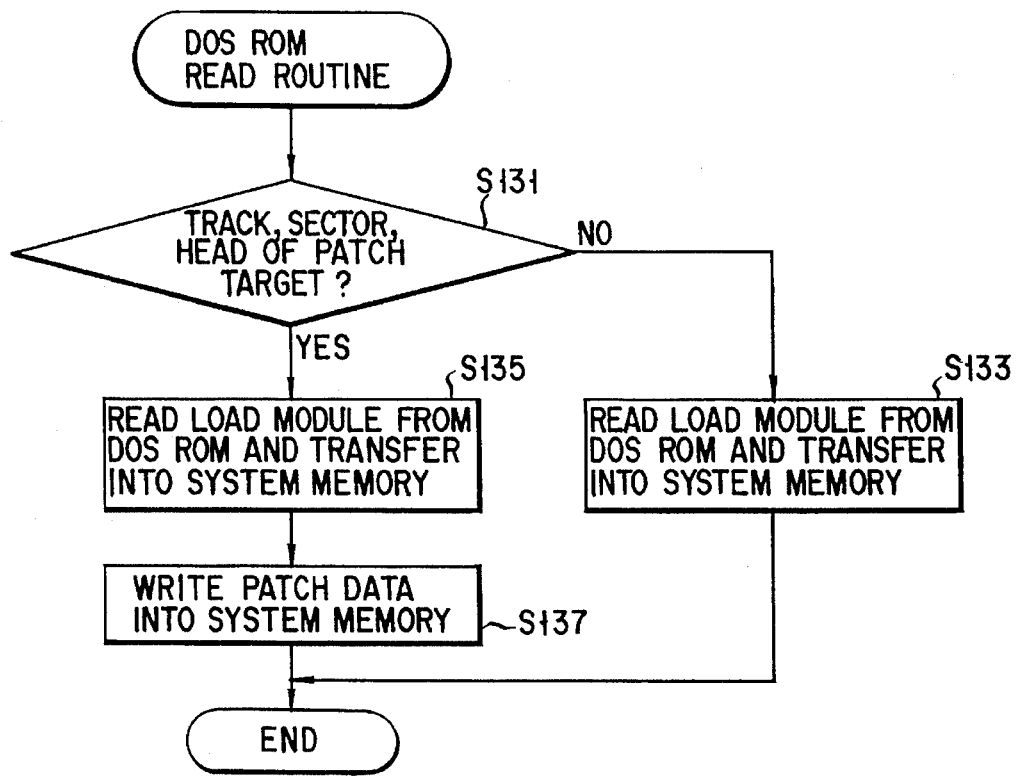
FIG. 28 is a flow chart for explaining patch processing of a DOS ROM in a portable computer according to the fifth embodiment of the present invention.

FIG. 28 shows a DOS ROM (21) read routine in the fifth embodiment. This read routine is executed when the BIOS (INT13H) is started with device number 81H upon loading the operating system from the DOS ROM 21 into the system memory of the main memory 12. A CPU 11 checks a read address (a track number, a sector number, and a head number) with respect to the DOS ROM 21, which address is supplied from a startup program, the boot program of an operating system, or a system file, and determines whether the address coincides with the address of a patch target (step S131). If the address does not coincide with the address of the patch target, the CPU 11 reads out a load module at a location corresponding to the address from the DOS ROM 21, and transfers it to the system memory of the main memory 12 (step S133).

If the read address with respect to the DOS ROM 21 coincides with the address of the patch target, the CPU 11 reads out the load module at a location corresponding to the address from the DOS ROM 21, and transfers it to the system memory of the main memory 12 (step S135). Thereafter, the CPU 11 writes patch data for performing program correction of the transferred load module in the system memory of the main memory 12 (step S137). With this operation, the operating system in the DOS ROM 21 can be directly corrected on the machine language level.

Figure 29:
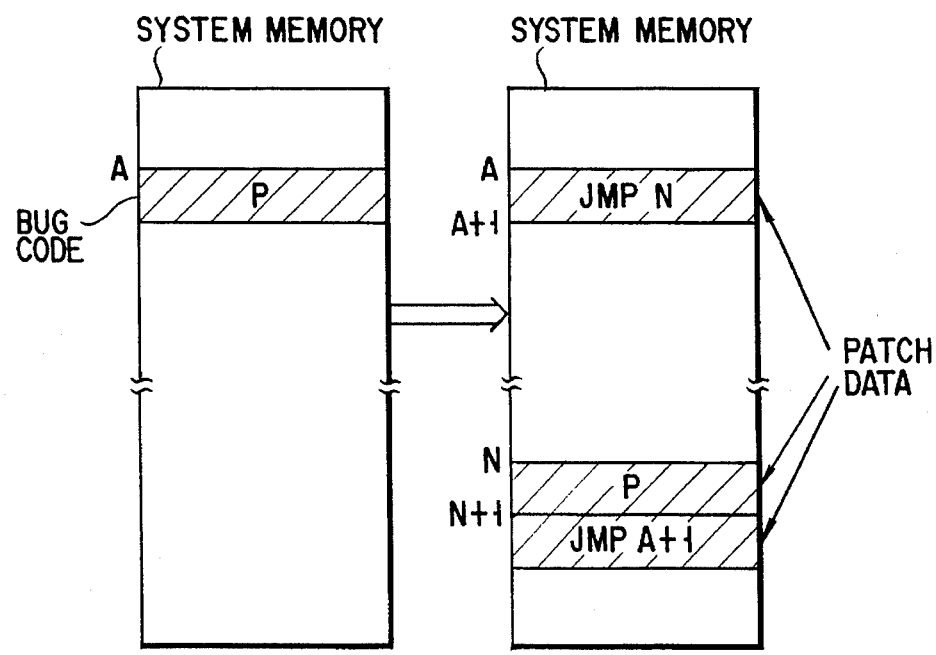
FIG. 29 is a view showing patch processing in the fifth embodiment.

FIG. 29 shows an example of program correction performed by patch processing. If, for example, there is a bug in an instruction (p) written at an address A of the system memory, the instruction is rewritten by a branch instruction (JMP N) at a branch destination N on the basis of patch data, and a correct instruction (P) is written in an area at an address N. In addition, a branch instruction (JMP A+1) to be restored to an address A+1 is written at an address N+1. With this operation, the instruction (P) is corrected by a correct instruction (P'). Correction may be performed by writing an NOP instruction depending on the contents of a bug.

As described above, in the fifth embodiment, patch processing can be automatically executed by the BIOS (INT13H) for loading the operating system from the DOS ROM 21 into the system memory of the main memory 12, while the operating system is loaded. Therefore, even if there is a bug in the operating system, the bug can be easily corrected.

In this case, the contents of patch processing to be executed by the BIOS (INT13H), i.e., the address of a patch target as a branch condition in step S71, and patch data to be written in the system memory, must be changed depending on the location and contents of a bug in the operating system. However, since a system ROM 13 in which the BIOS (INT13H) is stored is constituted by the OPT, as described above, the BIOS (INT13H) can be easily re-programmed in accordance with the contents of patch processing to be executed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable computer which operates under the control of an operating system, the portable computer having a predetermined memory allocated to an address space, comprising:

a first read only memory (ROM) for storing the operating system in advance, said first ROM being allocated to the same address space as that allocated to said predetermined memory in said portable computer; and bank switching means, including a keyboard controller, for allocating said first ROM and said predetermined memory to the address space as first and second memory banks, and for performing bank switching between the first and second memory banks by changing a port address of said keyboard controller, thereby allowing selective access to said first ROM and said predetermined memory.

2. The computer according to claim 1, further comprising a second ROM for storing an application program in advance, said second ROM being allocated to the same address space as that of said first ROM, and wherein said bank switching means allocates said first ROM, said memory, and said second ROM as first, second, and third memory banks, and performs bank switching between the first through third memory banks.

3. The computer according to claim 2, wherein the operating system stored in said first ROM includes a program for displaying menu icons for selecting/designating execution of the operating system and the application program, the program being executed when the operating system is started.

4. The computer according to claim 1, wherein said memory allocated to the same address space as that of said first ROM includes a kanji ROM or a dictionary ROM.

5. A portable computer which operates under the control of an operating system, the portable computer having a predetermined memory allocated to an address space, comprising:

a first ROM for storing the operating system in advance, said first ROM being allocated to said address space in said portable computer;

a second ROM for storing an application program in advance, said second ROM being allocated to said address space; and bank switching means, including a keyboard controller, for allocating said first ROM and said predetermined memory to the address space as first and second memory banks, and for performing bank switching between the first and second memory banks by changing a port address of said keyboard controller thereby allowing selective access to said first ROM and said predetermined memory.

6. A portable computer which operates under the control of an operating system, the portable computer having a predetermined memory allocated to an address space, comprising:

a first ROM for storing the operating system in advance, said first ROM being allocated to said address space in said portable computer;

a second ROM for storing an application program in advance, said second ROM being allocated to said address space; and bank switching means, including a keyboard controller, for allocating said first and second ROMs to said address space as first and second memory banks, and for performing bank switching between the first and second memory banks by changing a port address of said keyboard controller, thereby allowing selective access to said first and second ROMs.

7. The computer according to claim 6, wherein the operating system stored in said first ROM includes a program for displaying menu icons for selecting/designating execution of the operating system and the application program, the program being executed when the operating system is started.

* * * * *